United States Patent
Parker et al.

(10) Patent No.: US 11,023,482 B2
(45) Date of Patent: Jun. 1, 2021

(54) AUTHORING OF DATA VISUALIZATIONS AND MAPS

(71) Applicant: Microsoft Technology Licensing, LLC, Redmond, WA (US)

(72) Inventors: Charles W. Parker, Sammamish, WA (US); Ned B. Friend, Seattle, WA (US); Erez Kikin-Gil, Redmond, WA (US); Matthew J. Kotler, Sammamish, WA (US); B. Scott Ruble, Bellevue, WA (US); Igor Zaika, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 16/238,881

(22) Filed: Jan. 3, 2019

(65) Prior Publication Data

US 2019/0138520 A1 May 9, 2019

Related U.S. Application Data

(63) Continuation of application No. 13/272,832, filed on Oct. 13, 2011, now Pat. No. 10,198,485.

(51) Int. Cl.
*G06F 3/048* (2013.01)
*G06F 16/248* (2019.01)
(Continued)

(52) U.S. Cl.
CPC ............ *G06F 16/248* (2019.01); *G06T 11/00* (2013.01); *G06T 11/206* (2013.01); *G09B 29/003* (2013.01)

(58) Field of Classification Search
CPC ...... G06F 16/248; G06T 11/00; G06T 11/206; G09B 29/003
(Continued)

(56) References Cited

U.S. PATENT DOCUMENTS

| 4,831,552 A | 5/1989 | Scully et al. |
| 5,297,250 A | 3/1994 | Leroy et al. |

(Continued)

FOREIGN PATENT DOCUMENTS

| CN | 1551567 | 12/2004 |
| CN | 1723431 | 1/2006 |

(Continued)

OTHER PUBLICATIONS

"Introducing Amazon QuickSight—YouTube", Retrieved from: https://www.youtube.com/watch?v=Tj0gW4XI6vU, Retrieved on: Feb. 25, 2019, 2 Pages.

(Continued)

*Primary Examiner* — Shourjo Dasgupta

(57) ABSTRACT

A visualization of computer-enabled information in association with a computer-enabled map is provided. One or more data items may be imported onto a computer-generated mapping surface. A data visualization application may obtain location information, for example, physical address or latitude/longitude coordinates, for each data item. A map showing a geographical area large enough to contain each data item may be automatically generated and displayed, and each data item may be located on the map and may be identified by an identifying icon or label. Selection of an icon or label for any of the data items may cause display of information about the data item. The map display and visualization of the data items on the map display may be dynamically modified as one or more other data items are imported onto the visualization surface or as one or more existing data items are removed from the visualization surface.

19 Claims, 12 Drawing Sheets

(51) Int. Cl.
*G09B 29/00* (2006.01)
*G06T 11/00* (2006.01)
*G06T 11/20* (2006.01)

(58) Field of Classification Search
USPC .......................................................... 715/771
See application file for complete search history.

(56) References Cited

U.S. PATENT DOCUMENTS

| | | | |
|---|---|---|---|
| 5,495,269 A | 2/1996 | Elrod et al. | |
| 5,566,291 A | 10/1996 | Boulton et al. | |
| 5,675,752 A | 10/1997 | Scott et al. | |
| 5,704,029 A | 12/1997 | Wright, Jr. | |
| 5,717,869 A | 2/1998 | Moran et al. | |
| 5,802,299 A | 9/1998 | Logan et al. | |
| 5,821,925 A | 10/1998 | Carey et al. | |
| 5,821,932 A | 10/1998 | Pittore | |
| 5,893,098 A | 4/1999 | Peters et al. | |
| 5,907,324 A | 5/1999 | Larson et al. | |
| 6,016,478 A | 1/2000 | Zhang et al. | |
| 6,018,346 A | 1/2000 | Moran | |
| 6,119,147 A | 9/2000 | Toomey | |
| 6,192,395 B1 | 2/2001 | Lerner et al. | |
| 6,208,339 B1 | 3/2001 | Atlas et al. | |
| 6,230,185 B1 | 5/2001 | Salas et al. | |
| 6,353,436 B1 | 3/2002 | Reichlen | |
| 6,546,246 B1 | 4/2003 | Bridges | |
| 6,553,417 B1 | 4/2003 | Gampper | |
| 6,586,349 B1 | 7/2003 | Jeon | |
| 6,633,315 B1 | 10/2003 | Sobeski et al. | |
| 6,639,836 B1 | 10/2003 | Hung | |
| 6,670,970 B1 | 12/2003 | Bonura et al. | |
| 6,735,615 B1 | 5/2004 | Iwayama et al. | |
| 6,738,075 B1 | 5/2004 | Torres et al. | |
| 6,842,176 B2 | 1/2005 | Sang'udi et al. | |
| 6,926,799 B2 | 8/2005 | Yeom | |
| 6,933,495 B1 | 8/2005 | Yeom | |
| 6,995,768 B2 | 2/2006 | Jou et al. | |
| 7,035,865 B2 | 4/2006 | Doss | |
| 7,036,076 B2 | 4/2006 | Anwar | |
| 7,051,285 B1 | 5/2006 | Harrison et al. | |
| 7,073,127 B2 | 7/2006 | Zhao et al. | |
| 7,075,513 B2 | 7/2006 | Silverberg | |
| 7,124,164 B1 | 10/2006 | Chemtob | |
| 7,171,567 B1 | 1/2007 | Bayer et al. | |
| 7,203,479 B2 | 4/2007 | Deeds | |
| 7,225,257 B2 | 5/2007 | Aoike et al. | |
| 7,233,933 B2 | 6/2007 | Horvitz et al. | |
| 7,242,389 B1 | 7/2007 | Stern | |
| 7,246,316 B2 | 7/2007 | Furlong et al. | |
| 7,248,677 B2 | 7/2007 | Randall et al. | |
| 7,251,786 B2 | 7/2007 | Wynn et al. | |
| 7,269,787 B2 | 9/2007 | Amitay et al. | |
| 7,299,193 B2 | 11/2007 | Cragun et al. | |
| 7,299,405 B1 | 11/2007 | Lee et al. | |
| 7,299,418 B2 | 11/2007 | Dieberger | |
| 7,401,300 B2 | 7/2008 | Murmi | |
| 7,426,297 B2 | 9/2008 | Zhang et al. | |
| 7,447,713 B1 | 11/2008 | Berkheimer | |
| 7,451,186 B2 | 11/2008 | Morinigo et al. | |
| 7,454,439 B1 * | 11/2008 | Gansner ................ | H04L 41/22 |
| 7,466,334 B1 | 12/2008 | Baba | |
| 7,469,222 B1 | 12/2008 | Glazer | |
| 7,478,129 B1 | 1/2009 | Chemtob | |
| 7,512,906 B1 | 3/2009 | Baier et al. | |
| 7,554,576 B2 | 6/2009 | Erol et al. | |
| 7,571,210 B2 | 8/2009 | Swanson et al. | |
| 7,590,941 B2 | 9/2009 | Wee | |
| 7,599,989 B2 | 10/2009 | Stevens et al. | |
| 7,606,862 B2 | 10/2009 | Swearingen et al. | |
| 7,627,830 B1 | 12/2009 | Espinoza et al. | |
| 7,636,754 B2 | 12/2009 | Zhu et al. | |
| 7,669,141 B1 | 2/2010 | Pegg | |
| 7,679,518 B1 | 3/2010 | Pabla et al. | |
| 7,730,411 B2 | 6/2010 | Chotai et al. | |
| 7,743,098 B2 | 6/2010 | Anglin et al. | |
| 7,764,247 B2 | 7/2010 | Blanco et al. | |
| 7,770,116 B2 | 8/2010 | Zhang et al. | |
| 7,774,221 B2 | 8/2010 | Miller et al. | |
| 7,799,706 B2 | 9/2010 | Yeom | |
| 7,818,678 B2 | 10/2010 | Massand | |
| 7,869,941 B2 | 1/2011 | Coughlin et al. | |
| 7,911,409 B1 | 3/2011 | Chatterjee et al. | |
| 7,919,142 B2 | 4/2011 | Yeom | |
| 7,941,399 B2 | 5/2011 | Bailor et al. | |
| 7,962,525 B2 | 6/2011 | Kansal | |
| 7,984,387 B2 | 7/2011 | Batthish et al. | |
| 7,992,089 B2 | 8/2011 | Murray et al. | |
| 8,032,832 B2 | 10/2011 | Russ et al. | |
| 8,099,458 B2 | 1/2012 | Burtner, IV et al. | |
| 8,126,974 B2 | 2/2012 | Lyle et al. | |
| 8,150,719 B2 | 4/2012 | Perrella et al. | |
| 8,161,419 B2 | 4/2012 | Palahnuk et al. | |
| 8,204,942 B2 | 6/2012 | Roskind et al. | |
| 8,214,748 B2 | 7/2012 | Srikanth et al. | |
| 8,330,795 B2 | 12/2012 | Iyer et al. | |
| 8,358,762 B1 | 1/2013 | Renner et al. | |
| 8,385,964 B2 * | 2/2013 | Haney .................... | H04W 4/10 |
| | | | 455/519 |
| 8,423,883 B1 | 4/2013 | Stockman | |
| 8,437,461 B1 | 5/2013 | Gartner et al. | |
| 8,452,839 B2 | 5/2013 | Heikes et al. | |
| 8,517,888 B1 | 8/2013 | Brookins | |
| 8,560,487 B2 | 10/2013 | Jhoney et al. | |
| 8,583,148 B2 | 11/2013 | Ollila et al. | |
| 8,606,517 B1 | 12/2013 | Ehrlacher et al. | |
| 8,631,119 B2 | 1/2014 | Malkin et al. | |
| 8,682,973 B2 | 3/2014 | Kikin-Gil et al. | |
| 8,768,308 B2 | 7/2014 | Kim et al. | |
| 8,826,117 B1 | 9/2014 | Junee et al. | |
| 10,198,485 B2 | 2/2019 | Parker | |
| 2001/0040592 A1 | 11/2001 | Foreman et al. | |
| 2002/0044683 A1 | 4/2002 | Deshpande et al. | |
| 2002/0059604 A1 | 5/2002 | Papagan et al. | |
| 2002/0060201 A1 | 5/2002 | Yeom | |
| 2002/0062403 A1 | 5/2002 | Burnett et al. | |
| 2002/0143876 A1 | 10/2002 | Boyer et al. | |
| 2002/0143877 A1 | 10/2002 | Hackbarth et al. | |
| 2003/0020805 A1 | 1/2003 | Allen et al. | |
| 2003/0038831 A1 | 2/2003 | Engelfriet | |
| 2003/0061284 A1 | 3/2003 | Mandarino et al. | |
| 2003/0122863 A1 | 7/2003 | Dieberger et al. | |
| 2003/0137539 A1 | 7/2003 | Dees | |
| 2003/0142133 A1 | 7/2003 | Brown et al. | |
| 2003/0158900 A1 | 8/2003 | Santos | |
| 2003/0172174 A1 | 9/2003 | Mihalcheon | |
| 2003/0209519 A1 | 11/2003 | Yeom | |
| 2003/0222890 A1 | 12/2003 | Salesin et al. | |
| 2004/0016876 A1 | 1/2004 | Yeom | |
| 2004/0024822 A1 | 2/2004 | Werndorfer et al. | |
| 2004/0027370 A1 | 2/2004 | Jaeger | |
| 2004/0030992 A1 | 2/2004 | Molsa et al. | |
| 2004/0034622 A1 | 2/2004 | Espinoza et al. | |
| 2004/0062383 A1 | 4/2004 | Sylvain | |
| 2004/0085354 A1 | 5/2004 | Massand | |
| 2004/0128350 A1 | 7/2004 | Topfl et al. | |
| 2004/0150627 A1 | 8/2004 | Luman et al. | |
| 2004/0161090 A1 | 8/2004 | Digate et al. | |
| 2004/0169683 A1 | 9/2004 | Chiu et al. | |
| 2004/0175036 A1 | 9/2004 | Graham | |
| 2004/0196286 A1 | 10/2004 | Guzik | |
| 2004/0254998 A1 | 12/2004 | Horvitz | |
| 2004/0263636 A1 | 12/2004 | Cutler et al. | |
| 2004/0267701 A1 | 12/2004 | Horvitz et al. | |
| 2005/0005025 A1 | 1/2005 | Harville et al. | |
| 2005/0018828 A1 | 1/2005 | Nierhaus et al. | |
| 2005/0055625 A1 | 3/2005 | Kloss | |
| 2005/0081160 A1 | 4/2005 | Wee et al. | |
| 2005/0088410 A1 | 4/2005 | Chaudhri | |
| 2005/0091571 A1 | 4/2005 | Leichtling | |
| 2005/0091596 A1 | 4/2005 | Anthony et al. | |
| 2005/0125246 A1 | 6/2005 | Muller et al. | |
| 2005/0125717 A1 | 6/2005 | Segal et al. | |
| 2005/0138109 A1 | 6/2005 | Redlich et al. | |

(56) References Cited

U.S. PATENT DOCUMENTS

| | | |
|---|---|---|
| 2005/0138570 A1 | 6/2005 | Good et al. |
| 2005/0171830 A1 | 8/2005 | Miller et al. |
| 2005/0246642 A1 | 11/2005 | Valderas et al. |
| 2006/0004911 A1 | 1/2006 | Becker |
| 2006/0010023 A1 | 1/2006 | Tromczynski et al. |
| 2006/0010197 A1 | 1/2006 | Overden |
| 2006/0026253 A1 | 2/2006 | Kessen et al. |
| 2006/0050610 A1 | 3/2006 | Harvey |
| 2006/0053380 A1 | 3/2006 | Spataro |
| 2006/0067250 A1 | 3/2006 | Boyer et al. |
| 2006/0080610 A1 | 4/2006 | Kaminsky |
| 2006/0082594 A1 | 4/2006 | Vafiadis et al. |
| 2006/0132507 A1 | 6/2006 | Wang |
| 2006/0136828 A1 | 6/2006 | Asano |
| 2006/0143063 A1 | 6/2006 | Braun et al. |
| 2006/0146765 A1 | 7/2006 | Van De Sluis et al. |
| 2006/0161585 A1 | 7/2006 | Clarke et al. |
| 2006/0167996 A1 | 7/2006 | Orsolini et al. |
| 2006/0168533 A1 | 7/2006 | Yip et al. |
| 2006/0171515 A1 | 8/2006 | Hintermeister et al. |
| 2006/0184872 A1 | 8/2006 | Dontcheva et al. |
| 2006/0190547 A1 | 8/2006 | Bhogal et al. |
| 2006/0195587 A1 | 8/2006 | Cadiz et al. |
| 2006/0213443 A1 | 9/2006 | Yeom |
| 2006/0234735 A1 | 10/2006 | Digate et al. |
| 2006/0239212 A1 | 10/2006 | Pirzada et al. |
| 2006/0259875 A1 | 11/2006 | Collins et al. |
| 2006/0265398 A1 | 11/2006 | Kaufman |
| 2006/0282759 A1 | 12/2006 | Collins et al. |
| 2007/0005752 A1 | 1/2007 | Chawla et al. |
| 2007/0011231 A1 | 1/2007 | Manion et al. |
| 2007/0074268 A1 | 3/2007 | Pepper et al. |
| 2007/0083597 A1 | 4/2007 | Salesky et al. |
| 2007/0100937 A1 | 5/2007 | Burtner et al. |
| 2007/0106724 A1 | 5/2007 | Gorti |
| 2007/0112926 A1 | 5/2007 | Brett et al. |
| 2007/0150583 A1 | 6/2007 | Asthana et al. |
| 2007/0168447 A1 | 7/2007 | Chen et al. |
| 2007/0174389 A1 | 7/2007 | Armstrong |
| 2007/0185870 A1 | 8/2007 | Hogue et al. |
| 2007/0189487 A1 | 8/2007 | Sharland et al. |
| 2007/0214423 A1 | 9/2007 | Teplov et al. |
| 2007/0219645 A1* | 9/2007 | Thomas ............... G05B 15/02 700/29 |
| 2007/0226032 A1 | 9/2007 | White |
| 2007/0245238 A1 | 10/2007 | Fugitt et al. |
| 2007/0253424 A1 | 11/2007 | Herot et al. |
| 2007/0276909 A1 | 11/2007 | Chavda et al. |
| 2007/0279416 A1 | 12/2007 | Cobb et al. |
| 2007/0294612 A1 | 12/2007 | Drucker |
| 2007/0300185 A1 | 12/2007 | Macbeth et al. |
| 2008/0005235 A1 | 1/2008 | Hedge |
| 2008/0008458 A1 | 1/2008 | Gudipaty et al. |
| 2008/0013698 A1 | 1/2008 | Holtzberg |
| 2008/0022225 A1 | 1/2008 | Erl |
| 2008/0040187 A1 | 2/2008 | Carraher et al. |
| 2008/0040188 A1 | 2/2008 | Klausmeier |
| 2008/0059889 A1 | 3/2008 | Parker et al. |
| 2008/0065580 A1 | 3/2008 | Spence et al. |
| 2008/0066016 A1 | 3/2008 | Dowdy et al. |
| 2008/0084984 A1 | 4/2008 | Levy et al. |
| 2008/0086688 A1 | 4/2008 | Chandratillake |
| 2008/0098328 A1 | 4/2008 | Rollin et al. |
| 2008/0114844 A1 | 5/2008 | Sanchez et al. |
| 2008/0115076 A1* | 5/2008 | Frank ............... G06F 16/29 715/771 |
| 2008/0136897 A1 | 6/2008 | Morishima et al. |
| 2008/0141126 A1 | 6/2008 | Johnson |
| 2008/0177782 A1 | 7/2008 | Poston et al. |
| 2008/0189624 A1 | 8/2008 | Chotai et al. |
| 2008/0195981 A1 | 8/2008 | Puller et al. |
| 2008/0239995 A1 | 10/2008 | Lee et al. |
| 2008/0244442 A1 | 10/2008 | Vaselova et al. |
| 2008/0263460 A1 | 10/2008 | Altberg |
| 2008/0276174 A1 | 11/2008 | Hintermeister et al. |
| 2008/0288889 A1 | 11/2008 | Hunt et al. |
| 2008/0300944 A1 | 12/2008 | Surazski et al. |
| 2008/0303746 A1 | 12/2008 | Schlottmann et al. |
| 2008/0307322 A1 | 12/2008 | Stochosky |
| 2008/0320082 A1 | 12/2008 | Kuhlke et al. |
| 2009/0006980 A1 | 1/2009 | Hawley |
| 2009/0006982 A1 | 1/2009 | Curtis et al. |
| 2009/0007014 A1 | 1/2009 | Coomer et al. |
| 2009/0019367 A1 | 1/2009 | Cavagnari et al. |
| 2009/0030766 A1 | 1/2009 | Denner et al. |
| 2009/0037848 A1 | 2/2009 | Tewari et al. |
| 2009/0043856 A1 | 2/2009 | Darby |
| 2009/0055739 A1 | 2/2009 | Murillo et al. |
| 2009/0089055 A1 | 4/2009 | Caspi |
| 2009/0094367 A1 | 4/2009 | Song et al. |
| 2009/0109180 A1 | 4/2009 | Do |
| 2009/0112703 A1 | 4/2009 | Brown |
| 2009/0119255 A1* | 5/2009 | Frank ............... G06F 40/30 |
| 2009/0119604 A1 | 5/2009 | Simard |
| 2009/0129596 A1 | 5/2009 | Chavez et al. |
| 2009/0138552 A1 | 5/2009 | Johnson et al. |
| 2009/0138826 A1 | 5/2009 | Barros |
| 2009/0183095 A1 | 7/2009 | Deitsch et al. |
| 2009/0204671 A1 | 8/2009 | Hawkins et al. |
| 2009/0210793 A1 | 8/2009 | Yee et al. |
| 2009/0222741 A1 | 9/2009 | Shaw et al. |
| 2009/0228569 A1 | 9/2009 | Kalmanje et al. |
| 2009/0234721 A1 | 9/2009 | Bigelow et al. |
| 2009/0235177 A1 | 9/2009 | Saul et al. |
| 2009/0249223 A1 | 10/2009 | Barsook et al. |
| 2009/0254843 A1 | 10/2009 | Van Wie et al. |
| 2009/0265632 A1 | 10/2009 | Russ et al. |
| 2009/0282339 A1 | 11/2009 | Van Melle et al. |
| 2009/0309846 A1 | 12/2009 | Trachtenberg |
| 2009/0313584 A1 | 12/2009 | Kerr et al. |
| 2009/0319562 A1 | 12/2009 | Holm-Petersen et al. |
| 2010/0031152 A1 | 2/2010 | Villaron et al. |
| 2010/0037140 A1 | 2/2010 | Penner et al. |
| 2010/0037151 A1 | 2/2010 | Ackerman |
| 2010/0058201 A1 | 3/2010 | Harvey et al. |
| 2010/0097331 A1 | 4/2010 | Wu |
| 2010/0114691 A1 | 5/2010 | Wu et al. |
| 2010/0114991 A1 | 5/2010 | Chaudhary et al. |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0174993 A1 | 7/2010 | Pennington et al. |
| 2010/0201707 A1* | 8/2010 | Rasmussen ............... G06T 11/40 345/620 |
| 2010/0235216 A1 | 9/2010 | Hehmeyer et al. |
| 2010/0235763 A1 | 9/2010 | Massand |
| 2010/0241968 A1 | 9/2010 | Tarara et al. |
| 2010/0251140 A1 | 9/2010 | Tipirneni |
| 2010/0268705 A1 | 10/2010 | Douglas et al. |
| 2010/0279266 A1 | 11/2010 | Laine et al. |
| 2010/0306004 A1 | 12/2010 | Burtner et al. |
| 2010/0306018 A1 | 12/2010 | Burtner et al. |
| 2010/0312706 A1 | 12/2010 | Combet et al. |
| 2010/0324963 A1 | 12/2010 | Gupta et al. |
| 2011/0022967 A1 | 1/2011 | Vijayakumar et al. |
| 2011/0105092 A1* | 5/2011 | Felt ............... H04W 4/18 455/414.1 |
| 2011/0107241 A1 | 5/2011 | Moore |
| 2011/0113348 A1 | 5/2011 | Twiss et al. |
| 2011/0113351 A1 | 5/2011 | Phillips |
| 2011/0137894 A1 | 6/2011 | Narayanan et al. |
| 2011/0154180 A1 | 6/2011 | Evanitsky et al. |
| 2011/0161130 A1 | 6/2011 | Whalin et al. |
| 2011/0185288 A1 | 7/2011 | Gupta et al. |
| 2011/0212430 A1 | 9/2011 | Smithmier et al. |
| 2011/0239142 A1 | 9/2011 | Steeves et al. |
| 2011/0282871 A1* | 11/2011 | Seefeld ............... G06F 16/9537 707/723 |
| 2011/0289142 A1 | 11/2011 | Whalin et al. |
| 2011/0289433 A1 | 11/2011 | Whalin et al. |
| 2011/0295879 A1 | 12/2011 | Logis et al. |
| 2012/0023418 A1 | 1/2012 | Frields et al. |
| 2012/0050197 A1 | 3/2012 | Kemmochi |
| 2012/0075337 A1 | 3/2012 | Rasmussen et al. |

(56) References Cited

U.S. PATENT DOCUMENTS

| | | | |
|---|---|---|---|
| 2012/0078708 | A1 | 3/2012 | Taylor et al. |
| 2012/0129347 | A1 | 5/2012 | Yeom |
| 2012/0144325 | A1* | 6/2012 | Mital .................. G06T 11/206 715/763 |
| 2012/0150577 | A1 | 6/2012 | Berg |
| 2012/0150863 | A1 | 6/2012 | Fish |
| 2012/0159347 | A1 | 6/2012 | Fish |
| 2012/0159355 | A1 | 6/2012 | Fish |
| 2012/0166985 | A1 | 6/2012 | Friend |
| 2012/0179980 | A1 | 7/2012 | Whalin et al. |
| 2012/0179981 | A1 | 7/2012 | Whalin et al. |
| 2012/0233543 | A1 | 9/2012 | Vagell et al. |
| 2013/0007103 | A1 | 1/2013 | Braun et al. |
| 2013/0035853 | A1* | 2/2013 | Stout .................. G06F 16/29 701/438 |
| 2013/0091205 | A1 | 4/2013 | Kotler et al. |
| 2013/0091440 | A1 | 4/2013 | Kotler et al. |
| 2013/0091465 | A1 | 4/2013 | Kikin-Gil et al. |
| 2013/0101978 | A1 | 4/2013 | Ahl et al. |
| 2013/0124978 | A1 | 5/2013 | Horns et al. |
| 2013/0132886 | A1 | 5/2013 | Mangini et al. |
| 2013/0154946 | A1 | 6/2013 | Sakuramata et al. |
| 2013/0211980 | A1 | 8/2013 | Heiferman et al. |
| 2013/0212494 | A1 | 8/2013 | Heiferman et al. |
| 2013/0239002 | A1 | 9/2013 | Maloney et al. |
| 2013/0246903 | A1 | 9/2013 | Mukai |
| 2013/0263020 | A1 | 10/2013 | Heiferman et al. |
| 2014/0033068 | A1 | 1/2014 | Gupta et al. |
| 2014/0207867 | A1 | 7/2014 | Kotler et al. |
| 2014/0317561 | A1 | 10/2014 | Robinson et al. |
| 2015/0127628 | A1 | 5/2015 | Rathod |

FOREIGN PATENT DOCUMENTS

| | | |
|---|---|---|
| CN | 1928859 | 3/2007 |
| CN | 1992625 | 7/2007 |
| CN | 101689188 | 3/2010 |
| CN | 101834905 | 9/2010 |
| EP | 1517260 | 3/2005 |
| JP | 04-257046 | 9/1992 |
| KR | 10-2002-0039840 | 5/2002 |
| KR | 10-0380660 | 4/2003 |
| KR | 10-2006-0102755 | 9/2006 |
| KR | 10-2006-0118084 | 11/2006 |
| KR | 10-2006-0118085 | 11/2006 |
| KR | 10-0668075 | 1/2007 |
| KR | 10-0691618 | 3/2007 |
| KR | 10-0786635 | 12/2007 |
| KR | 10-2009-0067553 | 6/2009 |
| KR | 10-0959640 | 5/2010 |
| RU | 2005139793 | 6/2007 |
| WO | WO2002061682 | 8/2002 |
| WO | WO2006100475 | 9/2006 |
| WO | WO2007092470 | 8/2007 |

OTHER PUBLICATIONS

"Activity Explorer: Activity-centric Collaboration from Research to Product," IBM Systems Journal, IBM.RTM., 23 pages accessed on Feb. 3, 2009, accessed at: http://www.research.ibm.com/journal/sj/454 /geyer.html.
"Adobe Connect", Retrieved from: <http://www.adobe.com/acom/connectnow/> on Oct. 11, 2010, (Sep. 16, 2010), 3 pages.
"Adobe ConnectNow", Retrieved from: <http://www.adobe.com/acom/connectnow/> on Oct. 13, 2010, (2010), 6 pages.
"Aquatic Sugar: The Children's Interface, Translated for Adults," One Laptop Per Child News, Nov. 7, 2007, 5 pages.
"Cisco Context-Aware Mobility Solution: Presence Applications", retrieved from https://www.cisco.com/en/US/solutions/collateral/ns340/ns394/ns348/n- s788/brochure c22-497557.html on Sep. 7, 2010, 5 pages.
"Collaboration within the Telepresence Experience"—Published Date: Jan. 2010, http://www.wrplatinum.com/Downloads/11056.aspx, 11 pgs.
"CounterPoint: A Zooming Presentation Tool"; http://web.archive.org/web/20050205082738/www.cs.umd.edu/hcil/counterpoin- t/, Archive.org 2005 Capture, 3 pgs. (Cited in Feb. 4, 2011 OA).
"CSS Max-width Property" by W3Schools, archived by Internet Archive WaybackMachine Jun. 8, 2007, downloaded Nov. 16, 2012; 1 pg. (cited in Nov. 20, 2012 OA).
"Datapoint". Version 1.1, 1997-2007, FileDudes.com, 2 pages.
"Description for SharePoint Meeting Manager", Retrieved from: <http://www.softQicks.neUsoftware/Business/Project-ManagemenUSharePoin- t-Meeting-Manaaer-47146.htm> on Oct. 11, 2010 (Jul. 27, 2009),2 pages.
"Free PhotoMesa 3.1.2 (Windows)", retrieved on Dec. 28, 2007 at <<http://www.windsorinterfaces.com/photomesa.shtml>>, Windsor Interfaces Inc., 3 pages.
"GoToMeeting", Retrieved from: <httQ//www.gotomeeting.com/fec/online meeting> on Oct. 11, 2010, 1 page.
"Meet mimio—The Digital Meeting Assistant", Mayflower Business Systems Limited; http://www.kda.co.uk/mimio1/whiteQaQer.html. (May 1999), 10 pages.
"Meeting Center Using Video in Your Meetings"; Retrieved at <<http://www.oucs.ox.ac.uk/webex/Windows/Video.pdf>>, May 13, 2009, 2 pgs.
"Meeting Management Software", Retrieved from: <http://workingsmarter.typepad.com/myweblog/2004/12/meeting managem.html> on Oct 11, 2010, (Dec. 10, 2004), 2 pages.
"Microsoft Office Communicator 2007 Gelling Started Guide", retrieved from http://www.ittdublin.ie/media/Media 22233en.odf (Jul. 2007), 77 pages.
"Microsoft Word's Click and Type Feature", published by SnipTools, Nov. 12, 2003 downloaded Jun. 28, 2015 from http://sniptools.com/vault/microsoft-words-click-and-type-feature.
"Microsoft.RTM. Office Live Meeting Feature Guide", Microsoft Corporation, Available at <http://download.microsoft.com/download/8/0/3/803f9 ba6-5e 12-4b40-84d9-d8a91073e3dc/LiveMeeting.doc>,(Jan. 2005), pp. 1-17.
"Online Calendar & Group Scheduling": MOSAIC Technologies, retrieved from ,http://www.webexone.com/Brandded/ID.asp?brandid=2348&pg=%20AppCalendar. On Apr. 29, 2009, 4 pgs.
"The Platinum Experience of Collaboration—CollaboratorHYPERMAX", Retrieved Date: Jul. 16, 2010, http://www.businessoctane.com/group_telepresence.php, 7 pgs.
"The Screen Capture Tool" by Help and Manual, archived Mar. 13, 1006 by the Internet Wayback Machine, downloaded Nov. 28, 2016 from https://web.archive.org/web/20060313150929/http://www.helpandmanual.com/h- elp/help_toc.html?hm_advanced_tools_capture_.
Adams, et al., "Distributed Research Teams: Meeting Asynchronously in Virtual Space", Institute of Electrical and Electronics Engineers (1999), 17 pages.
An Overview of Aabel 3 Features, Gigawiz, http://www.gigawiz.com/Aabel.html, pp. 1-19 (Date Retrieved Jul. 21, 2010).
Bell, David et al., "Sensory Semantic User Interfaces (SenSUI) (position paper)", Fluidity Research Grouo: Brunei Universitv. (Oct. 20, 2009), 14 pages.
Bunzel, Tom "Using Quindi Meeting Capture", retrieved from http://www.informit.com/guides/content.as[2x?g=msoffice&segNum=220, (Sep. 1, 2006), 3 pages.
Cathy, et al., "Mindshift Innovation", Oct. 4, 2007, 2 pages.
Chinese Fifth Office Action dated May 30, 2014 in Appln No. 200980131157.5, 9 pgs.
Chinese Notice of Allowance dated Nov. 30, 2016, in Appln No. 201210382816.6, 4 pgs.
Chinese Office Action dated Feb. 3, 2015 in Appln No. 201210382816.6, 13 pgs.
Chinese Office Action dated Nov. 2, 2014 in Appln No. 201210376181.9, 16 pgs.
Chinese Second Office Action dated Aug. 26, 2015 in Appln No. 201210382816.6, 14 pgs.
Chinese Third Office Action dated Feb. 22, 2016 in Appln No. 201210382816.6, 10 pgs.

(56) References Cited

OTHER PUBLICATIONS

Create treemaps using easy drag-and-drop interaction, MagnaView, http://www.magnaview.nl/treemap/, 1 page. (Date Retrieved Jul. 21, 2010).
Derthick, M. et al., "An Interactive Visualization Environment for Data Exploration," Proceedings of Knowledge Discovery in Databases, AAAI Press, pp. 2-9 (Aug. 1997).
Fernando et al., "Narrowcasting Attributes for Presence Awareness in Collaborative Virtual Environments", Published Date: 2006, http://ieeexploreleee.org/stamp/stamp.jsp?tp=&arnumber=4019930, 6 pgs.
Fourth Office Action Issued in Chinese Patent Application No. 201210382816.6, dated Sep. 1, 2016, 6 Pages.
Fruchter, Renate "Brick & Bits & Interaction (BBI)", http://www.ii.ist.i.kyotou.ac.io/sid/sid2001/oaoers/oositions/bricksbitsi-nteraction.odf (2001), 4 pages.
Gallegos, D., et al. "CounterPoint User Manual" class project for Charles Paine at the University of New Mexico, Downloaded from Archive. Org 2005 capture, http://web.archive.org/web/20050205082738/www.cs.umd.edu/hcil/co-unterpoint/, 21 pgs., (Cited in Feb. 4, 2011 OA).
GeoTime, Retrieved Jul. 19, 2010, http://www.geotime.com/Product/GeoTime-(1)/Features-Benefits.aspx, 7 pgs.
Good et al. (2001) "CounterPoint: Creating Jazzy Interactive Presentations"; HCIL Tech Report #Mar. 2001, University of Maryland, College Park, MD 20742, 9 pgs., (Cited in Feb. 4, 2011 OA).
Grass Roots Software; "FREEPATH-EDU Nonlinear Presentation Software"; http://www.fullcompass.com/product/233150.html; 3 Pgs.
Greenberg et al.; "Human and Technical Factors of distributed Group Drawing Tools," Interacting with Computers 4 (1), Dec. 1992, Butterworth-Heinemann (Special edition on CSCW, Tom Rodden ed.) pp. 364-392. (cited in Mar. 3, 2009 OA).
Hewagamage, et al., Interactive Visualization of Spatiotemporal Patterns Using Spirals on a Geographical Map, Published 1999, http://ieeexplore.ieee.org/stamp/stamp.jsp?arnumber=00795916, 8 pgs.
Hupfer et al., "Introducing Collaboration into an Application Development Environment," CSCW '04, Nov. 6-10, 2004, 4 pages.
Ionescu, Ama et al., "Workspace Navigator: Tools for Capture, Recall and Reuse using Spatial Cues in an Interactive Workspace", Stanford Technical Re[2ort TRApr. 2002 htto://bci.stanford.edu/research/wksocNavTR.odf (2002), 16 pages.
Izadi et al., "Dynamo: A public interactive surface supporting the cooperative sharing and exchange of media"—Published Date: Apr. 2007, http://hci.stanford.edu/publications/2007/range-wip-final.pdf, 10 pgs.
J. Ambrose Little, High-End Business Intelligence with Data Visualization for WPF 4, Published Jun. 29, 2010, http://www.codeproject.com/KB/showcase/DataVisualizationWPF4.aspx, 7 pgs.
John Nelson, Just Around the Corner: Visual Fusion 4.5, Published Sep. 30, 2009, http://www.idvsolutions.com/press_newsletter_vfx45_silverlight.aspx-, 6 pgs.
Ju, Wendy et al., "Where the Wild Things Work: Capturing Shared Physical Design Workspaces"; Stanford University, CSCW '04, Nov 601-, pp. 533-541.
Kang, et al. Effects of Lateral Charge Spreading on the Reliability of TANOS (TaN/AlO/SiN/Oxide/Si) NAND Flash Memo, IEEE 45th Annual International Reliability Physics Conference, Phoenix, AZ, 167-169 (3 pages) (2007).
Haklay, et al., "Openstreetmap: User-Generated Street Maps", In Proceedings of IEEE Pervasive Computing, vol. 7, Issue: 4, Oct. 17, 2008, pp. 12-18.
Notice of Allowance dated Feb. 12, 2018, U.S. Appl. No. 13/271,148, 7 pages.
Office Action dated Apr. 20, 2016, in U.S. Appl. No. 13/271,148, 33 pgs.
Office Action dated Aug. 11, 2014, in U.S. Appl. No. 12/184,174, 50 pgs.
Office Action dated Aug. 14, 2014, in U.S. Appl. No. 13/253,886, 17 pgs.
Office Action dated Dec. 29, 2017, in U.S. Appl. No. 12/472,101, 9 pgs.
Office Action dated Dec. 4, 2014, in U.S. Appl. No. 13/271,148, 56 pgs.
Office Action dated Feb. 9, 2017, in U.S. Appl. No. 13/271,148, 19 pgs.
Office Action dated Jul. 17, 2014, in U.S. Appl. No. 12/968,332.
Office Action dated Jul. 17, 2015, in U.S. Appl. No. 13/271,148, 22 pgs.
Office Action dated Jul. 18, 2014, in U.S. Appl. No. 14/225,234.
Office Action dated Jul. 31, 2014, in U.S. Appl. No. 12/473,206.
Office Action dated Jun. 5, 2014, in U.S. Appl. No. 12/965,965.
Office Action dated Oct. 4, 2016, in U.S. Appl. No. 13/271,148, 20 pgs.
Office Action dated Sep. 16, 2014, in U.S. Appl. No. 12/472,101, 14 pgs.
Office Action in European Application No. 0903312.9 dated Dec. 6, 2017, 7pgs.
Peddemors, A.J.H. et al., "Presence, Location and Instant Messaging in a Context-Aware Application Framework", retrieved from htt://citeseerx.ist.psu.edu/viewdoc/download?doi=10.11.1.98.3321&rep=rep1&type=pdf; 4th International Conference on Mobile Data Management MDM (2003),6 pages.
Photodex Corporation; "ProShow Producer Feature Overview"; http://www.photodex.com/products/producer/features.html; 2008; 2 Pgs.
Rudnicky, Alexander I., et al., "Intelligently Integrating Information from Speech and Vision to Perform Light-weight Meeting Understanding", retrieved from http://citeseerx.ist.psu.edu/viewdoc/download?doi=10.1.1.126.1733&rep=re-p1&type=pdf. (Oct. 2005), 6 pages.
Shaw, "Create Pan and Zoom Effects in PowerPoint", 2007, Microsoft Corporation, 10 pages.
The Beginner's Guide to Data Visualization, Tableau Software, http://www.tableausoftware.com/beginners-data-visualization, pp. 1-6 (Date Retrieved Jul. 21, 2010).
Thomas, "Through-Walls Collaboration"—Published Date: 2009, http://ieeexplore.ieee.org/stamp/stamp.jsp?tp=&arnumber=5165559, 8 pgs.
U.S. Appl. No. 13/271,148, filed Oct. 11, 2011 entitled "Interactive Visualization of Multiple Software Functionality Content Items".
Visualize and Map SalesForce Leads with SpatialKey, Retrieved Jul. 19, 2010, http://www.spatialkey.com/support/tutorials/visualize-and-map-sales- force-leads-with-spatialkey-part-ii/, 8 pgs.
Watson, Richard "What is Mobile Presence?", Retrieved from http://reseller.tmcnet.com/topics/unified-communications/articles/54033-w- hat-mobile-presence.htm, (Apr. 10, 2009), 4 pages.
Wempen, F., "PowerPoint 2007 Bible"; Feb. 27, 2007, John Wiley & Sons, 27 pgs. Excerpt, (Cited in Feb. 4, 2011 OA).
Werle, et al., "Active Documents Supporting Teamwork in a Ubiquitous Computing Environment"; Retrieved at <<http://docs.google.com/viewer?a=v&q=cache:iyt-5ZWZURYJ:citeseerx.ist.osu.-edu/viewdoc/download%3Fdoi%3D10.1.1.157.4661%26rep%3Drep1%26type%3Dpdf=sma-rt=layout=document=confeence=meeting=where=participant=is=within=the=docum-ent&h1=en&pid=b1&srcid=ADGEEShcctdCPK5oM1kGncxGqgHps9wIIDPOJAHtQX0xazPZISh-Lb_4JN551ty2X.
Weverka, "PowerPoint 2007 All-in-One Desk Reference for Dummies" Jan. 2007, Published by Wiley Publishing, 8 pgs., (cited in Mar. 13, 2012 OA).
Yu, Shoou-Jong et al., "Who Said What When? Capturing Important Moments of a Meeting", retrieved from http://repository.cmu.edu/cgi/viewcontent.cgi?article=1003&context=silicon valley; Technical Report, (Apr. 10-15, 2010),7 pages.
Zenghong, Wu et al., "Context Awareness and Modeling in Self-Adaptive Geo-Information Visualization", retrieved from http://icaci.org/documents/ICC_proceedings/ICC2009/html/refer/17_1.pdf on Aug. 30, 2010, 13 pages.
ZuiPrezi Ltd.; "ZuiPrezi Nonlinear Presentation Editor"; http://zuiprezi.kibu.hu/; 2007; 2 Pgs.
Kim, Hyun H., et al., "SmartMeeting: CMPT 481/811 Automatic Meeting Recording System", http://www.cs.usask.ca/grads/hyk564/homePage/811/CM PT%20811 %20final.doc, (2004),7 pages.

(56) References Cited

OTHER PUBLICATIONS

Krebs et al., "Supporting collaboration in heterogeneous environments," Journal of Management Information Systems, 20(4):199-228, 2004.

Lai, et al. Fluorinated ALD $Al_2O_3$ Gate Dielectrics by CF4 Plasma, IEEE Semiconductor Device Research Symposium (2 pages) (2005).

Lai, et al. Fluorine Effects on the Dipole Structures of the $Al_2O_3$ Thin Films and Characterization by Spectroscopic Ellipsometry, Appl Phys Lett 90, 172904-1-172904-3 (4 pages including cover page) (2007).

Lai, et al. Study of the Erase Mechanism of MANOS (Metal/$Al_2O_3$/SiN/$SiO_2$/Si) Device, IEEE Elec Dev Lett 28,643-646 (4 pages) (2007).

Lee, et al. A Novel SONOS Structure of $SiO2/SiN/Al_2O_3$ with TaN Metal Gate for Multi-Giga Bit Flash Memories, IEDM '03 Technical Digest, 26.5.1-26.5.4 (4 pages) (2003).

Lu, et al. Non-Volatile Memory Technology—Today and Tomorrow, Keynote Address, Proceedings of the 13th IPFA, Singapore (6 pages) (2006).

Mitrovic, Nikola et al., "Adaptive User Interface for Mobile Devices", retrieved from http://citeseerx.ist.pssu.edu/viewdoc/download?doi=10.1.1.140.4996&rep=re- p1 &type=pdf. (2002), 15 pages.

Moran et al., "Tailorable Domain Objects as Meeting Tools for an Electronic Whiteboard"—Published Date: 1998, http://www.fxpal.com/people/chiu/paper-mvc-CSCW98.pdf, 10 pgs.

\* cited by examiner

AUTHORING OF DATA VISUALIZATIONS AND MAPS

CROSS-REFERENCE TO RELATED APPLICATIONS

This application is a continuation of U.S. patent application Ser. No. 13/272,832 filed Oct. 13, 2011, U.S. Pat. No. 10,198,485, entitled, "AUTHORING OF DATA VISUALIZATIONS AND MAPS." The disclosure of this priority application is hereby incorporated by reference in its entirety into the present application.

BACKGROUND

Computer-enabled mapping systems have been developed to allow users to locate business and personal addresses, natural or human-made structures, topographical layouts, and the like. In a typical setting, users program a physical address into a mapping application in order to locate the address or to obtain travel directions to the address. Often, information used by a mapping application user is manually input from a computer-generated list or file, for example, entry of an address from a contacts file. Once a user locates an item of interest using a computer-enabled mapping application, he/she typically must rely on a physical information file or computer-generated information file for information about the located item of interest. Thus, there is a need for integration of computer-enabled information with a computer-enabled mapping application to provide a visualization of the computer-enabled information in association with a computer-enabled map.

It is with respect to these and other considerations that the present invention has been made.

SUMMARY

Embodiments of the present invention solve the above and other problems by providing for authoring of visualizations of computer-enabled information in association with computer-enabled maps. One or more data items, for example, a list of real estate offerings and a list of public schools in the same area as the real estate offerings, may be imported (e.g., dragged and dropped) onto a computer-generated mapping surface. A data visualization application may obtain location information, for example, physical address or latitude/longitude coordinates, for each data item. A map showing a geographical area large enough to contain each data item may be automatically generated and displayed, and each data item may be located on the map and may be identified by an identifying icon or label. A legend providing information for the data items may be displayed. Selection of an icon or label for any of the data items may cause display of an information box on the mapping surface to provide information about the data item associated with the selected icon or label. According to embodiments, the map display and visualization of the data items on the map display may be dynamically modified as one or more other data items are imported onto the visualization surface or as one or more existing data items are removed from the visualization surface. Thus, according to embodiments, any user viewing the computer-enabled map with access to one or more data sets of various types may construct their own visualizations on top of the map by moving (e.g., dragging and dropping) various data items or data sets onto the map where the moving of any data item onto the map or the moving of any data item off the map may result in a new and unique visualization and user experience.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
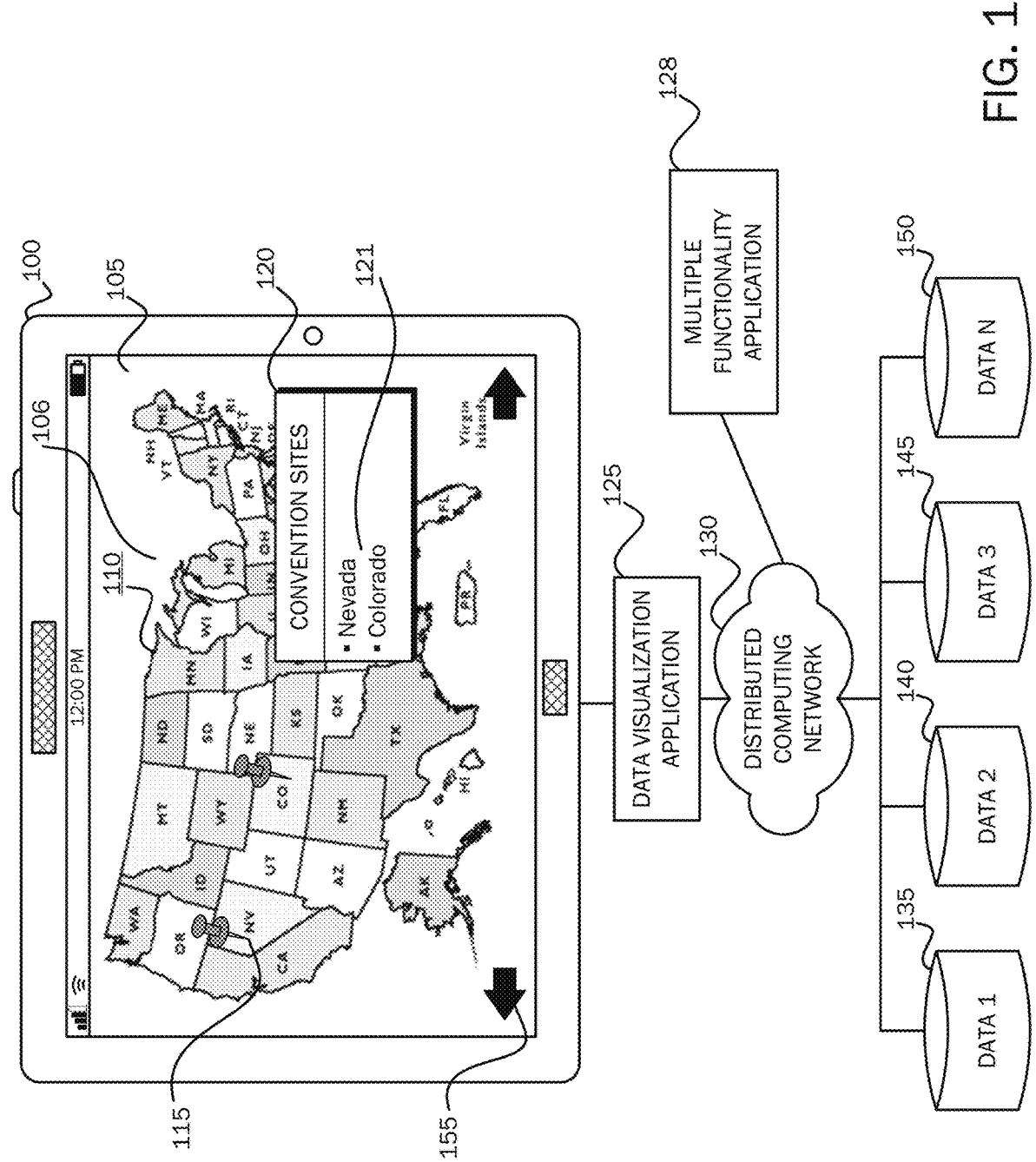
FIG. 1 is a simplified block diagram illustrating a system architecture for generating a data visualization of one or more data items in association with a computer-enabled map.

As briefly described above, embodiments of the present invention are directed to authoring (e.g., generating and editing) and displaying a visualization of one or more data items on a computer-generated map. One or more data items, for example, data items associated with an electronic file may be imported (e.g., dragged and dropped) onto an electronic mapping surface. For example, a spreadsheet application file containing names of various businesses and addresses for each of the various businesses may be dragged onto an electronic mapping surface. Likewise, the example spreadsheet application file may be selected from a menu of files for importing to the electronic mapping surface. A data visualization application may obtain location information from the imported file, for example, physical addresses or latitude/longitude coordinates, and pass the obtained physical information to an electronic mapping application for locating each data item on an electronic map.

The data visualization application may then generate an electronic map showing a geographical area large enough to contain each physical location associated with each imported data item. An electronic map may then be displayed on a visualization surface, and each imported data item may be identified on the electronic map by an identifying icon or label. Selection of one of the identifying icons or labels may cause a display of a text box or dialog box showing information about the data item associated with the selected icon or label. For example, the name of a business, address for the business, and any identifying information about the business obtained from the imported data item, for example, spreadsheet file, may be displayed in the text box or dialog box for review by a user.

If additional data items are imported to the electronic mapping surface, or if existing data items are removed from the mapping surface, the visualization for the data items in association with the electronic map may be dynamically changed for showing an updated visualization containing new or amended data items and associated information. In addition, data items imported onto the visualization surface may be interacted with by users, and if user interaction causes changes to imported data items, the associated visualization of data items on the electronic map may be dynamically modified.

As described in detail below, according to embodiments, each individual data item need not be moved onto the mapping surface separately for effecting a change to the mapping visualization responsive to each individual data item. Instead, one or more data visualizations may be moved onto the mapping surface where the one or more data visualizations include a plurality of layered or nested data items, and the mapping surface may be dynamically changed to reflect all the data items included in the data visualizations moved onto the mapping surface. In addition, data visualizations moved onto the surface may be modified by moving additional data onto the data visualization (e.g., a third data item and type such as locations of public and private schools). When a data visualization moved onto the mapping surface is thus modified, the data visualization may be modified and the mapping surface may be modified to reflect the new data. In addition, data items, for example, charts, moved onto the mapping surface may be linked back to data sources from which the data items are imported. If data in the data sources are changed, then the data items moved onto the mapping surface may be dynamically changed, and the mapping visualization likewise may be changed.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram illustrating a system architecture for generating a data visualization of one or more data items in association with a computer-enabled map. According to embodiments, the computing device 100 may be in the form of a variety of acceptable computing devices, for example, a general purpose computing device, personal computer, a laptop computer, a tablet computer, a slate-type computer, a mobile computer, a hand-held telephonic computer (e.g., mobile telephone or smart phone), a wall-type computing device and or display, and the like.

Input or other interaction with the computing device 100 may be performed according to a variety of input means. Suitable input means include, but are not limited to, keyboard/mouse entry/interaction, touch screen interaction, for example, where a user writes, draws, or otherwise interacts with software application functionality through touching the display screen of the computing device 100, electronic pen/stylus interaction, voice command, wherein for example, a user issues commands to software application functionality or issues voice-based content entry, gesture commands, and the like. According to an embodiment, for purposes of receiving voice-based and gesture-based input, the device 100 may be coupled a microphone operative to capture voice commands, and the device 100 may be coupled a camera operative to record and capture motions and/or gestures made by a user. Such a camera may be operative to provide motion detection capable of detecting movement from users for interpreting the movements as commands for causing changes in application functionality. For example, a camera may comprise a Microsoft® Kinect® motion capture device comprising a plurality of cameras and a plurality of microphones for capturing both motion and voice or other audio information.

Referring still to FIG. 1, a visualization surface 105 is displayed on a display screen of the computing device 100 for displaying a visualization 106 comprising an electronic map 110 with which is associated one or more data files 120 (and associated or included data items) and on which may be displayed one or more identifying icons or labels 115 for identifying locations on the map 110 associated with data items from an imported data file 120. According to one embodiment conditional formatting functionality may be applied to graphical features displayed on the visualization surface for enhancing user experience. For example, if green colored thumbtack icons are used to show locations of properties on a mapping visualization, conditional formatting may be applied to the thumbtack icons so that if any property has a value of $500,000 or more, the associated thumbtack changes from green color to blue color. Navigation controls 155 are illustrated for navigating the visualization 106 from one visualization display to another visualization display.

The data visualization application 125 is illustrative of a software application having sufficient computer executable instructions, which when executed by a computer, to provide a visualization 106 of one or more data items in association with a displayed electronic map. According to embodiments of the present invention, the data visualization application 125 is operative to receive one or more data items imported onto a visualization surface 105 and for displaying an electronic map comprising a geographic area large enough to include one or more data items. According to embodiments, the data visualization application 125 is operative to provide a display of the electronic map or to call on a separate electronic mapping application for obtaining a generated electronic map as required for displaying information associated with the imported data items. That is, the data visualization application 125 may operate as a standalone application on a given computing device, or the data visualization application 125 may operate as part of a service where application functionality and data are accessed via a distributed computing environment (e.g., cloud-based system) where for example the data visualization application 125 operates from a remote server and one or more data items dropped onto a client-side instance of the data visualization application are imported from one or more remote storage media. Further discussion of computing environments in which the data visualization application 125 and associated data may operate is set out below with reference for FIGS. 9-11.

In addition, the data visualization application is operative to generate and display one or more objects including text-based objects, spreadsheet application objects, slide presentation application objects, photographic images, graphical icons/images and the like on an electronic map 110 in association with one or more imported data items 121. As will be described below with reference to FIGS. 4-7, the data visualization application 125 is further operative to provide additional information about a given data item upon receipt of a selection of an icon/label 115 associated with a given data item.

According to embodiments, the data visualization application 125 is operative to cause a display of information in association with the electronic map 110 as a standalone application, or the data visualization application 125 is operative to obtain functionality for displaying the information in association with the map 110 from a variety of functionality applications 128. For example, the data visualization application 125 may cause the presentation of a text-based object in association with the map 110, or the application 125 may call on the functionality of a word processing application 128 for causing the display of a text-based object in association with the map 110. Similarly, the data visualization application 125 may cause the display of other data objects, such as spreadsheet objects, slide presentation objects, notes objects, comments objects, calendar objects, or any other displayable object, the display of which may be caused by the data visualization application 125 or the display of which may be caused by a separate application 128 called upon by the data visualization application 125 for required functionality.

According to embodiments, the data visualization application 125 may obtain information associated with an imported data item from one or more data repositories 135, 140, 145, 150. For example, if a person's name is imported onto the visualization surface 105, the data visualization application 125 may be operative for obtaining an address and other information for the person's name from a contacts database 135. Similarly, the data visualization application 125 may be operative for obtaining calendar information for the person from a calendar database 140. As should be appreciated, a variety of other information may be obtained by the data visualization application 125 in association with data items imported onto the visualization surface 105 in association with the map 110. For example, if a data file 120 is imported onto the visualization 105 including home listing information from a real estate listing service, the data visualization application 125 may be operative to obtain address information for the example homes listed on the listing service as well as information for the listed homes such as available square feet, numbers of rooms, price, and the like. Such information may be obtained from a data repository 145 associated with an example real estate listing service. The data repository 150 is illustrative of any other data repository containing information that may be accessed by the data visualization application 125 for display in association with the electronic map 110 as described herein. The data visualization application 125 may access the multiple functionality of the applications 128 and the various data repositories 135, 140, 145, 150 via local storage media or via a distributed computing network 130, such as the Internet.

Figure 2:
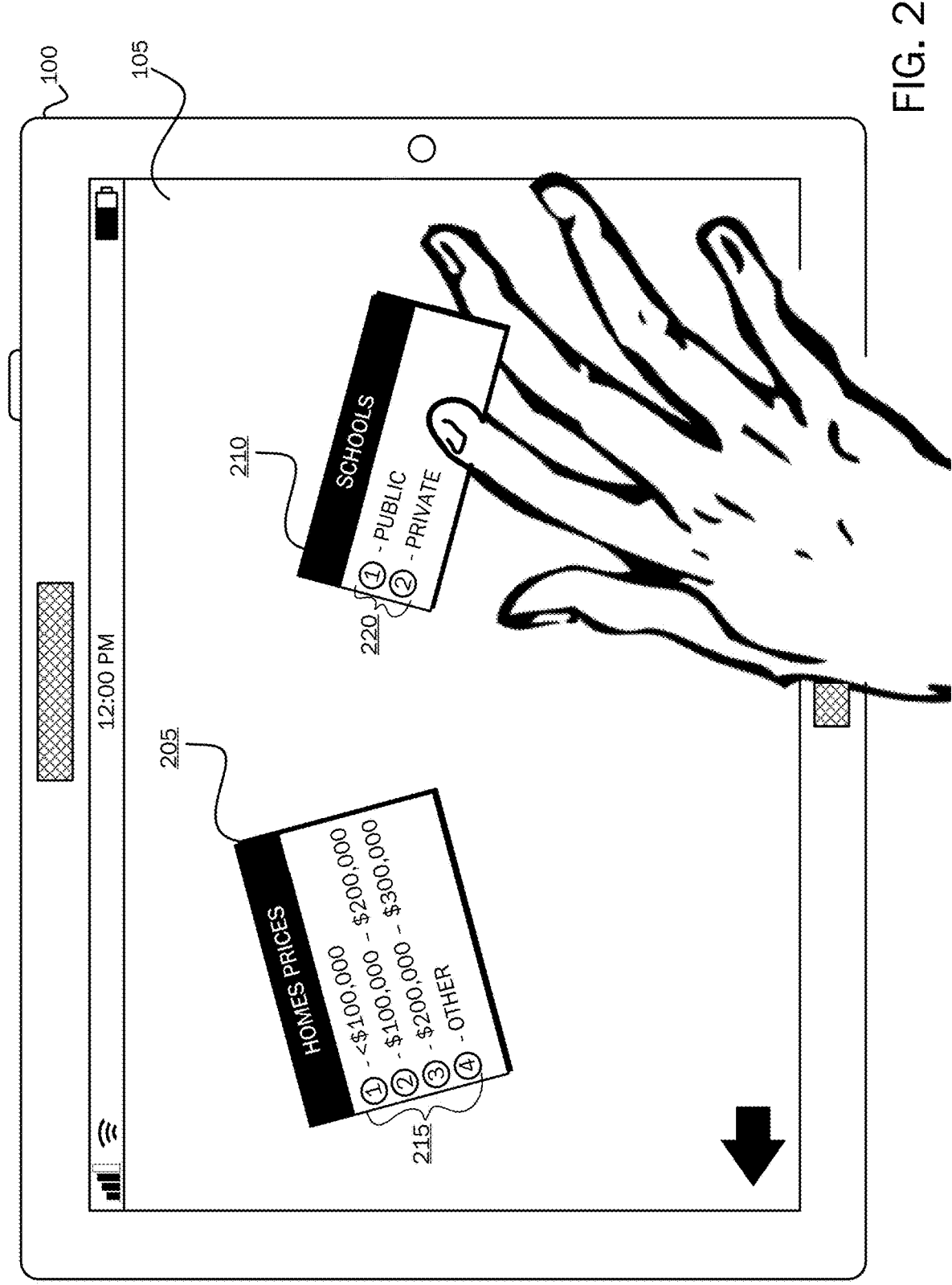
FIG. 2 is a simplified block diagram illustrating the importing of one or more data items onto a computer-generated mapping surface for generating a data visualization of the one or more data items on a computer-generated map.

A visualization 106 may be generated by the data visualization application 125 after one or more data items is imported onto the visualization surface 105 from which the data visualization application 125 generates or causes the generation of an electronic map 110 onto which data items, information about data items, and visualization representations 115 for data items may be displayed. The one or more data items may be imported onto the visualization surface 105 according to a variety of suitable means. Referring now to FIG. 2, according to one embodiment, one or more data items or one or more data files containing one or more data items may be dragged onto the visualization surface 105 for initially populating or priming the visualization surface 105 with one or more data items with which the data visualization application 125 may generate a visualization 106. That is, before any information is imported onto the visualization surface 105, the visualization surface 105 may be an empty display surface or "blank slate" having no graphical representation of any data items. According to one embodiment, data files 205, 210 including individual data items 215, 220 may be dragged and dropped onto the visualization surface 105 to populate or "prime" the data visualization application 125 with one or more data items with which to generate a visualization 106. The data files 205, 210 or individual data items 215, 220 may similarly be selected from a menu of data items for population onto the visualization surface 105.

Figure 3:
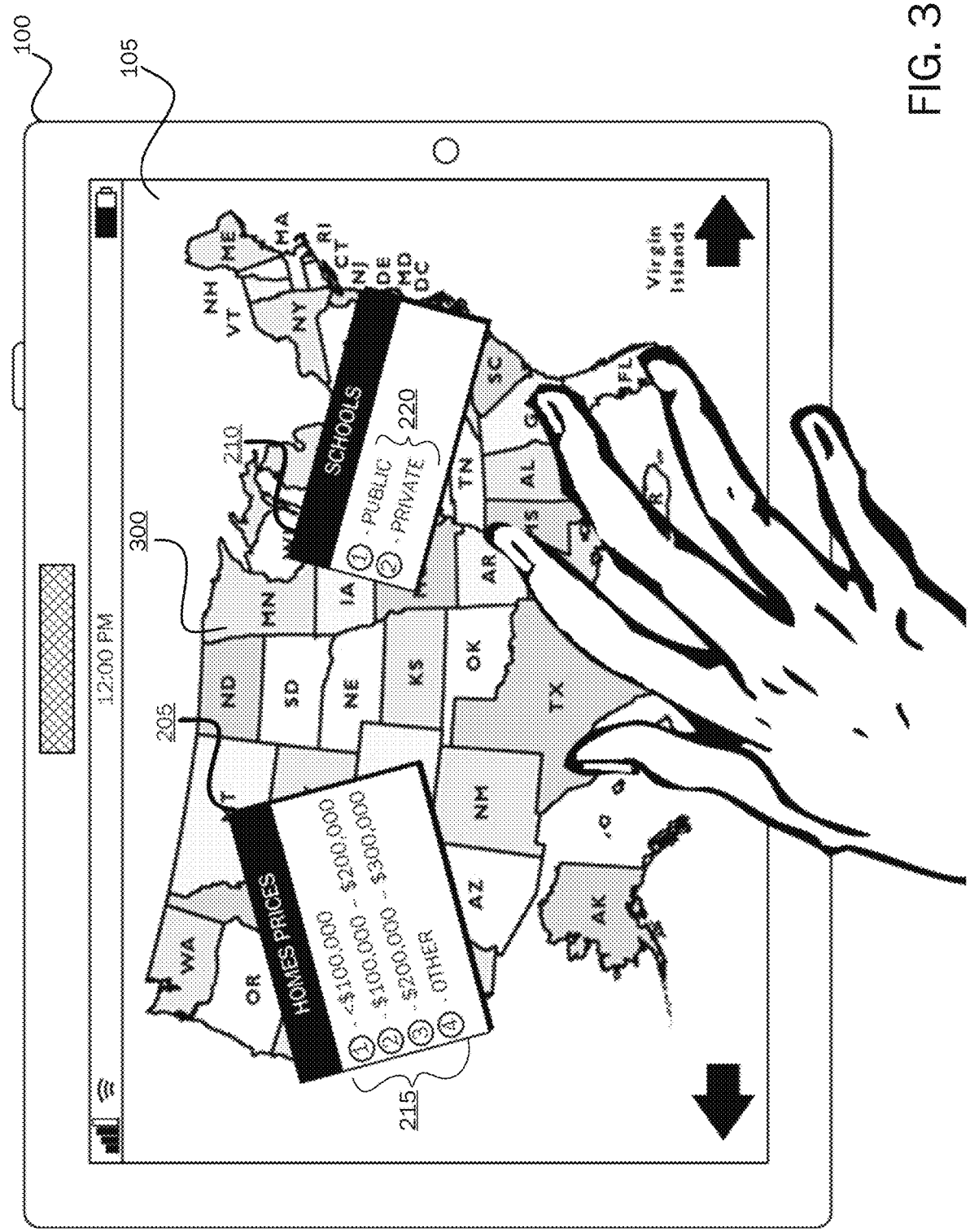
FIG. 3 is a simplified block diagram illustrating the importing of one or more data items onto a computer-generated mapping surface for generating a data visualization of the one or more data items on a computer-generated map.

Referring to FIG. 3, according to another embodiment, an initial display of an electronic map 300 may be displayed on the visualization surface 105, and the data files 205, 210 or individual data items 215, 220 may be dragged onto the electronic map 300 on the visualization surface 105, or may be selected from a menu of data files and/or data items for population onto the electronic map 300 displayed on the visualization surface 105. As further described below, the act of dragging the data files onto the visualization surface may cause the map to change even if data from the files is not represented on the mapping visualization surface. For example, starting with a generic map of the world, dragging onto it data that only has addresses in the data set from the United States may zoom the map to the United States (e.g., even without putting any "tacks" or other labels or icons on the map, etc.).

Figure 4:
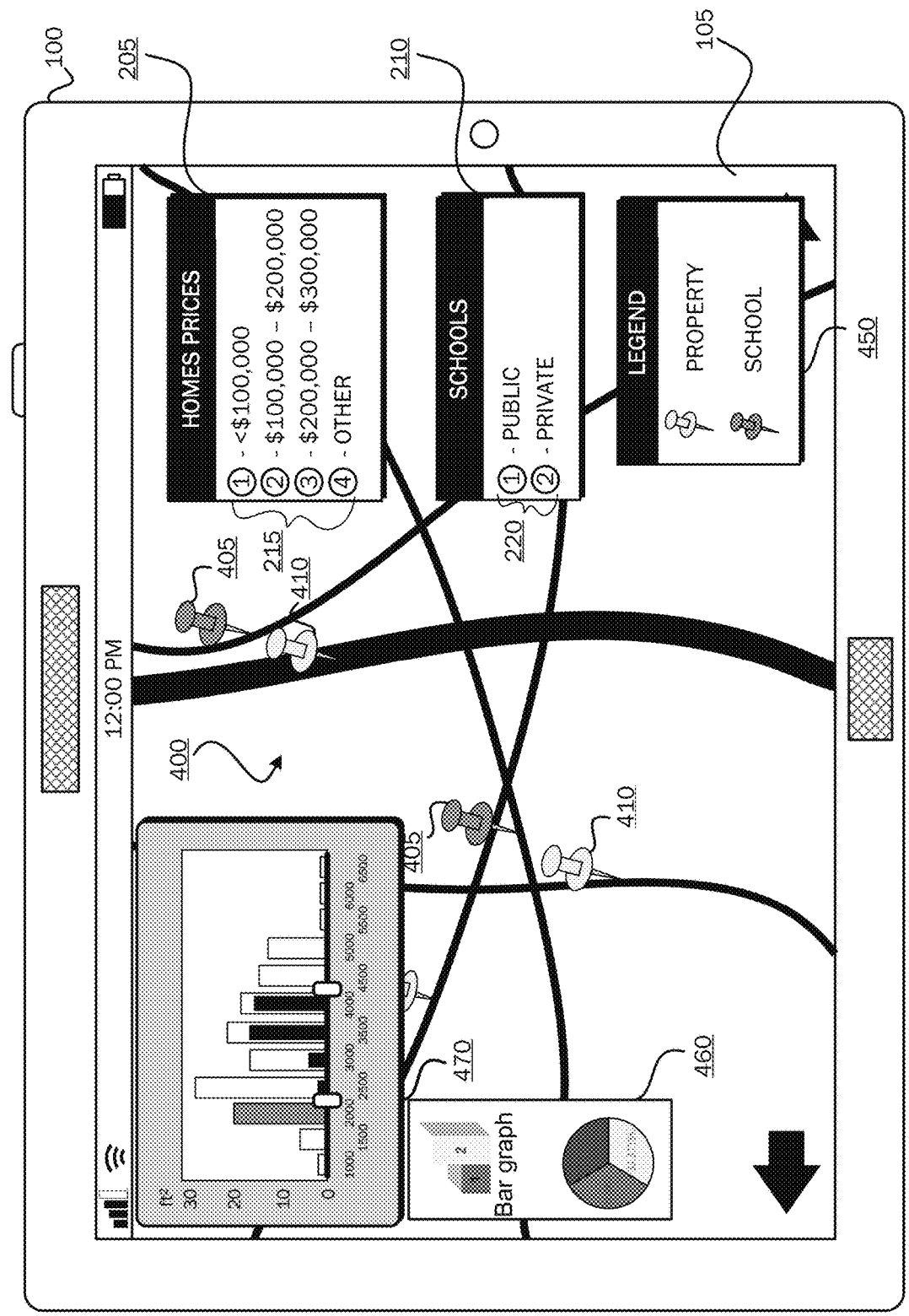
FIG. 4 is a simplified block diagram illustrating a visualization of one or more data items on a computer-generated map.

Referring now to FIG. 4, when the data files 205, 210 and/or individual data items or data visualizations 215, 220 are populated onto the visualization surface 105 or onto an initially displayed electronic map 300, the data visualization application 125 may parse the imported data files or individual data items for information with which the data visualization application 125 may obtain location information and other information for generating a visualization 106 for display on the visualization surface 105. For example, referring to the imported data file 205, the visualization application 125 may parse the imported data file 205 to find that the example data file 205 includes listings of real estate properties according to a variety of property price ranges.

When a data file, for example, a data file 205, 210 is moved onto the mapping surface as described herein, data contained in the data files may be obtained from one or more sources, for example, from columns of data contained in a spreadsheet file. According to embodiments, such imported data may be transformed into one or more data visualizations, for example, a chart of various types, for display on the mapping surface and for linking to the mapping surface and to other data visualizations imported onto the mapping visualization surface. Referring to FIG. 4, consider for example that a column of data showing housing prices per living area (e.g., price per square foot of space) is dropped onto the mapping visualization surface from a spreadsheet. When the column of data is dropped onto the visualization surface, a user interface component 460 may be presented showing the user various chart or other display objects the user may select for graphically representing the imported data on the mapping visualization surface. For example, a bar chart and a pie chart are illustrated from which the user may select a desired graphics type. As should be appreciated, the illustrated chart types are for purposes of example only, and numerous graphical representation types may be provided.

Continuing with the example, if the user selects the bar chart type for application to the imported data, the imported data will be presented in a chart of that type as illustrated in the bar chart 470. According to embodiments, the bar chart 470 may be linked to other data objects displayed on the mapping visualization, as well as, to the data source from which the imported bar chart data was obtained. Thus, changes to any data to which the example bar chart data is linked may cause corresponding changes to the bar chart data and to the data and data representations associated with other data objects or sources to which the bar chart data is linked.

According to an embodiment, the data visualization application 125 may pass information contained in the imported data files and/or visualizations 205, 210, 470 to a variety of data repositories 135, 140, 145, 150 for obtaining location information associated with the data contained in the imported data file 205. For example, the data visualization application may pass real estate property price ranges to a real estate listing service for obtaining location data, for example, addresses or latitude/longitude coordinates for real estate properties in an area prescribed in the imported data file 205 matching the real estate property prices listed in the imported data file 205. After obtaining location information for the example real estate properties, the visualization application 125 may utilize its own standalone mapping functionality, or the application 125 may call on a separate mapping application functionality for generating an electronic map 400 showing a geographical area of sufficient size for displaying information for each location associated with each data item, for example, real estate properties, listed in the imported data file 205. Similarly, for the imported data file 210, the data visualization application 125 may obtain location data and other information for individual data items contained in the imported data file 210 for generating or amending the visualization 106 to include information contained in the second file 210.

Referring still to FIG. 4, the electronic map 400 generated for the visualization 106 is displayed according to a geographical area of sufficient size for displaying identifying information and other information associated with each individual data item imported onto the visualization surface 105. For example, the electronic map 400 may represent a geographical area associated with a city or metropolitan area. Next, at a location on the map 400 associated with each individual data item, the data visualization application 125 may cause a display of an icon/image or label 405, 410 associated with a category of data types, or associated with each data item type. According to an embodiment, a legend 450 may be automatically displayed on the visualization surface 105 in association with the map 400 for defining the icons/images or labels 405, 410.

For example, referring to FIG. 4, an icon, such as a colored thumb tack icon 405 (e.g., green thumb tack), may be displayed on the map 400 at each location associated with a data item, for example, an individual real estate property, provided in the imported data file 205. Likewise, a different icon/image, for example, a red thumb tack icon 410 may be displayed at the locations of each data item imported from the second imported data file 210. Alternatively, a different display icon/image may be displayed on the map 400 for each individual data item contained in any imported data file 205, 210 such that a different or distinguishing icon/image is used for identifying each individual data item imported onto the visualization surface 105 and used for generating the displayed electronic map 400.

According to embodiments, if the imported data files 205, 210 or any individual data items contained in the imported data files 205, 210 are changed, the data visualization application 125 may dynamically change the display of the electronic map 400 in the visualization surface 105. For example, if the data file 210 is removed from the visualization surface 105, then the display of identification icons/images 410 and any other information associated with data items contained in the removed data file 210 will be removed by the data visualization application 125.

According to embodiments, each individual data item need not be moved onto the mapping surface separately for effecting a change to the mapping visualization responsive to each individual data item. Instead, one or more data visualizations may be moved onto the mapping surface where the one or more data visualizations include a plurality of layered or nested data items, and the mapping surface may be dynamically changed to reflect all the data items included in the data visualizations moved onto the mapping surface. For example, instead of moving a first data chart showing property prices onto the mapping surface, followed by moving a second data chart showing property tax rates onto the mapping surface, a data visualization comprising both data items and data types may be moved onto the mapping surface causing the mapping visualization to change to reflect the new data.

Moreover, the data visualizations moved onto the surface may be modified by moving additional data visualization (e.g., additional chart) onto the mapping surface to create an interdependency between the additional data visualization and other data visualizations already on the mapping surface (e.g., a third data item and type such as a chart showing locations of public and private schools). When a data visualization moved onto the mapping surface is modified, the modification may affect other data visualizations that are interdependent on the modified data visualization, and the mapping surface may be modified to reflect the modified data.

For example, a chart showing property prices and property tax rates may be moved onto the mapping surface. The chart may be displayed on the mapping surface, and data from the chart, for example, locations of properties matching prices on the chart may be identified or labeled on the map.

A user may then move a chart showing locations of public and private schools onto the now displayed chart showing property prices and property tax rates. When the new chart is dropped onto the mapping surface, an interdependent relationship may be formed between the two charts such that changes or filtering applied to one chart may affect the other chart and mapping that is displaying information for the two charts. For instance, if the public/private school chart is filtered to include only information for private schools, then the property prices/property tax rates chart similarly may be filtered to include only those homes associated with children attending private schools. The mapping of information from the two charts likewise may be modified as the two charts are modified.

In addition, data items, for example, charts, moved onto the mapping surface may be linked back to data sources from which the data items are imported. If data in the data sources are changed, then the data items moved onto the mapping surface may be dynamically changed, and the mapping visualization likewise may be changed. For example, if a chart is dropped onto the mapping surface containing property prices for a geographical area, and the data source from which the chart is obtained is changed, then the chart dropped onto the mapping surface may be dynamically changed, and the data reflected on the mapping surface likewise may be changed.

If the geographical display of the electronic map 400 will be different after the removal of one or more data items from the visualization surface 105, then the data visualization application 125 may cause the display of the electronic map 400 to be changed accordingly. For example, if data items removed from the visualization surface 105 allow for a presentation of an electronic map comprising 100 square miles of geographical area as opposed to the requirement of a geographical display area of 150 miles prior to the removal of the one or more data items, then the data visualization application 125 will change the display of the electronic map to an electronic map having a geographical display area of 100 miles after the removal of the one or more data items. For another example, if one or more data items are added to the visualization surface 105 requiring the display of an electronic map showing a different geographical area, for example, a different city, then the data visualization application 125 will dynamically change the display of the electronic map 400 to accommodate the display of identifying icons/images 405, 410 and any other related information for the one or more added data items.

Figure 5:
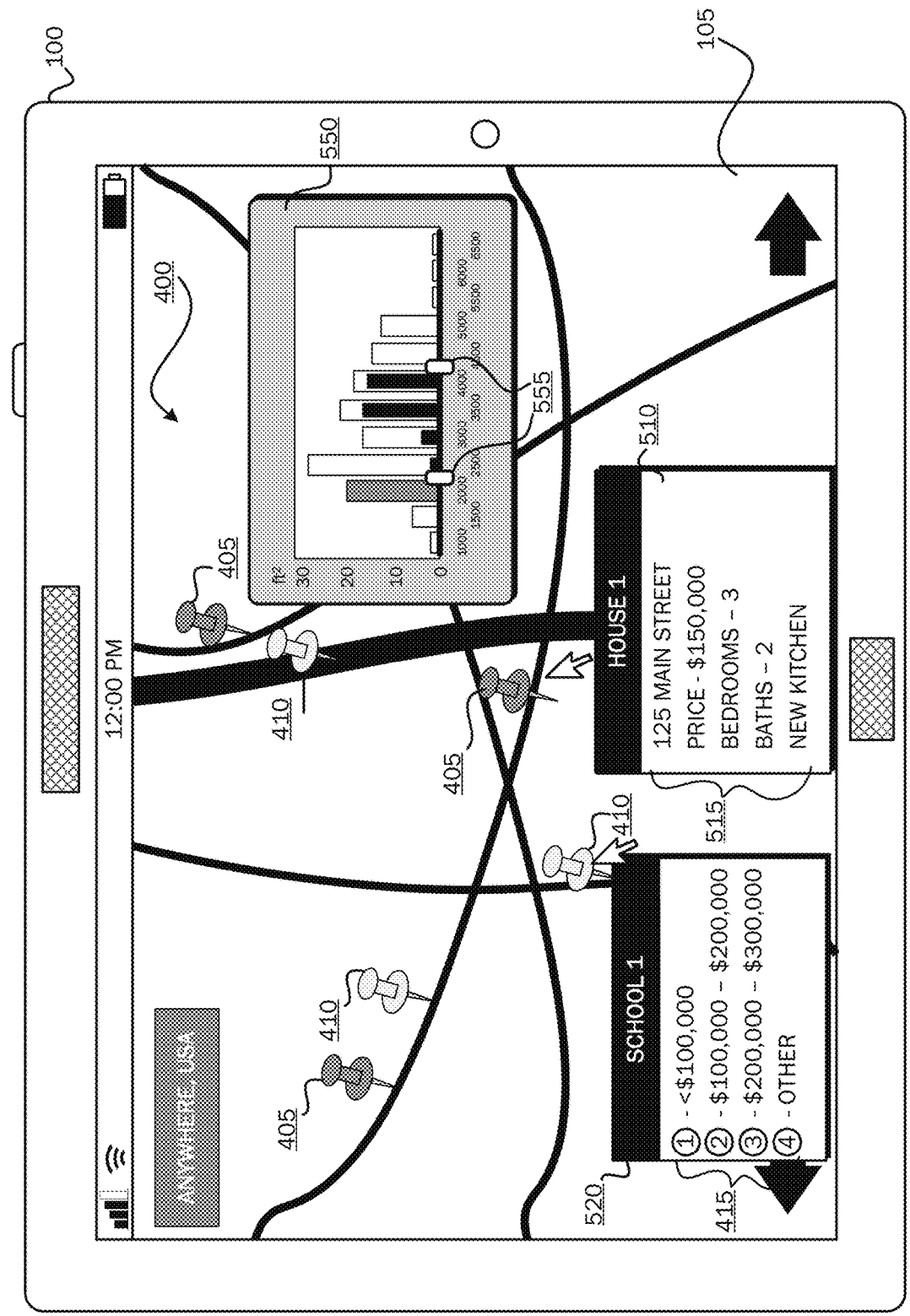
FIG. 5 is a simplified block diagram illustrating a visualization of one or more data items on a computer-generated map and showing a display of information associated with one or more identified data items.

Referring now to FIG. 5, in addition to obtaining location information for each individual data item imported onto the visualization surface 105, the data visualization application 125 may obtain other information about each individual data item for display in association with the electronic map 400 generated for the imported data items. Referring still to the real estate property listings example, described above, for each individual real estate property listing imported in a data file 205, the data visualization application 125 may obtain additional information from one of the data repositories 135, 140, 145, 150 described above. For example, for each individual real estate property listing, the data visualization application 125 may obtain a property owner name for the example property, an address for the example property, a listing price for the example property, a number of bedrooms, baths and other amenities for the example property, and the like.

The data visualization application 125 may then associate the obtained information with the identifying icon/image positioned on the electronic map 400 for the associated example property listing. Likewise, for the example schools listed in the example imported data file 210, the data visualization application 125 may obtain information for each listed school, for example, a school name, grades associated with each school, whether the school is public or private, the number of students at the school, and the like. Such information may then be associated with an icon/image 410 displayed on the electronic map 400 for the associated example school listing.

Referring now to FIG. 5, upon selection of an identifying icon/image 405, 410, the information obtained for the data item associated with the selected identification icon/image may be displayed in a text box or dialog box 510, 520, as illustrated in FIG. 5. That is, upon selection of an individual icon/image displayed on the electronic map 400 in association with a given data item, information associated with the data item may be dynamically displayed in a text box or dialog 510, 520 to allow users to review information obtained for the associated data item. For example, referring to FIG. 5, if an individual user is interested in learning about one or more real estate properties and about one or more schools located near various real estate properties, the visualization 106 generated by the data visualization application 125 may be utilized for receiving an automatic display of an electronic map 400 on which is displayed identifying icons/images for locating potential real estate properties and potential schools near potential real estate properties. Then, when user selects a given icon/image 405, 410, the information obtained by the data visualization application 125 for the associated data item may be displayed in the text box 510, 520, as illustrated in FIG. 5.

For example, if a user is interested in the attributes of a given real estate property, the user may select the red thumb tack icon 405 associated with a real estate property located on a street or in a location that is desirable to the user. Upon selection of the associated icon/image 405, the text box 510 may be displayed near the selected icon/image for displaying the information obtained about the example property listing. As illustrated in the text box 510, information 515 about the example property listing is displayed. Likewise, the user may select a nearby icon/image 410 associated with an example school to obtain information about the example school 415 in the text box 520.

According to embodiments, once a given visualization is generated comprising an electronic map and showing the locations of various points of interest in association with data items imported to the visualization surface, filtering may be done on the visualization in association with represented data items to dynamically change the visualization. Referring back to the real estate listings example, illustrated and described above with reference to FIGS. 4 and 5, a display of all listings associated with the imported data file 205 may cause a display of identifying icons/images associated with each example property listing contained in the imported data file. According to embodiments, if the user desires to filter the data items contained in the imported data file, the data visualization application 125 may cause the generated visualization to dynamically change as the data items are filtered. In addition, as described above, conditional formatting functionality may be applied to graphical features displayed on the visualization surface for enhancing user experience. For example, if green colored thumbtack icons are used to show locations of properties on a mapping visualization, conditional formatting may be applied to the thumbtack icons so that if any property has a value of $500,000 or more, the associated thumbtack changes from green color to blue color.

For example, if the user filters the data such that only data items associated with properties having prices below a certain threshold value, for example, below $200,000.00, are included in the visualization, then the data visualization application 125 will dynamically revise the visualization, and those identifying icons/images associated with properties not matching the data item filtering parameters will be dynamically removed from the visualization. For example, any properties with listing prices above the threshold value will be removed from the data items used by the application 125, and the identifying icons/images for those properties will dynamically disappear from view in the visualization 106. As should be appreciated, other filtering attributes might include usable space (e.g., square feet) associated with properties, numbers of bedrooms associated with properties, amenities associated with the properties and the like.

For another example, referring to the data file 210 associated with the schools, the user may decide to filter out those schools identified as private schools so that the user sees only information associated with public schools. Once the user filters the imported data file 210 to include only those items associated with public schools, then the identifying icons/images presented on the electronic map for private schools will dynamically disappear from view so that the user only sees those items associated with public schools. As should be appreciated, the filtering process may be done according to a variety of means. For example, a filtering dialog box may be exposed to allow the user to selectively filter among data items included in a given imported data file. Alternatively, a user may filter out certain items by dragging the items out of the imported data file to take those items off of the visualization surface 105. For another example, a function, such as a right click on the visualization surface may expose a menu allowing the user to select various functions, including a filter function for filtering data items associated with a present visualization.

According to embodiments, another type of data filtering that may be employed includes filtering on one visualization applied to the mapping visualization surface that causes filtering of all visualizations applied to the surface that are linked to or associated with the filtered visualization. For example, referring still to FIG. 5, a chart 550 is illustrated having been dropped onto the visualization surface and electronic map 400. The chart 550 shows a graphical representation of housing prices by living space (e.g., square feet of living space). A pair of filter tabs 555 is illustrated for filtering the data in the chart to show only data between the filter tabs. That is, by sliding the filter tabs 555, the chart 550 may be dynamically changed to show only data represented between the filter tab settings, for example, only houses with living areas (e.g., square feet) associated with prices between $200,000 and $300,000. According to embodiments, the other charts 510 and 520 may be linked to the square feet per price chart 550 such that filtering the chart 550 causes an automatic filtering of data contained in the charts 510 and 520 and causes a change in the mapping visualization to reflect the filtered data. As should be appreciated, the illustrated visualizations in FIG. 5 and all other figures described herein are for purposes of example only and are not limiting of other visualizations that may be utilized. Thus, the user may make authoring changes to both the data visualizations 510, 520, 550 and to the mapping surface simultaneously by making changes to any one or all of the respective data visualizations.

Figure 6:
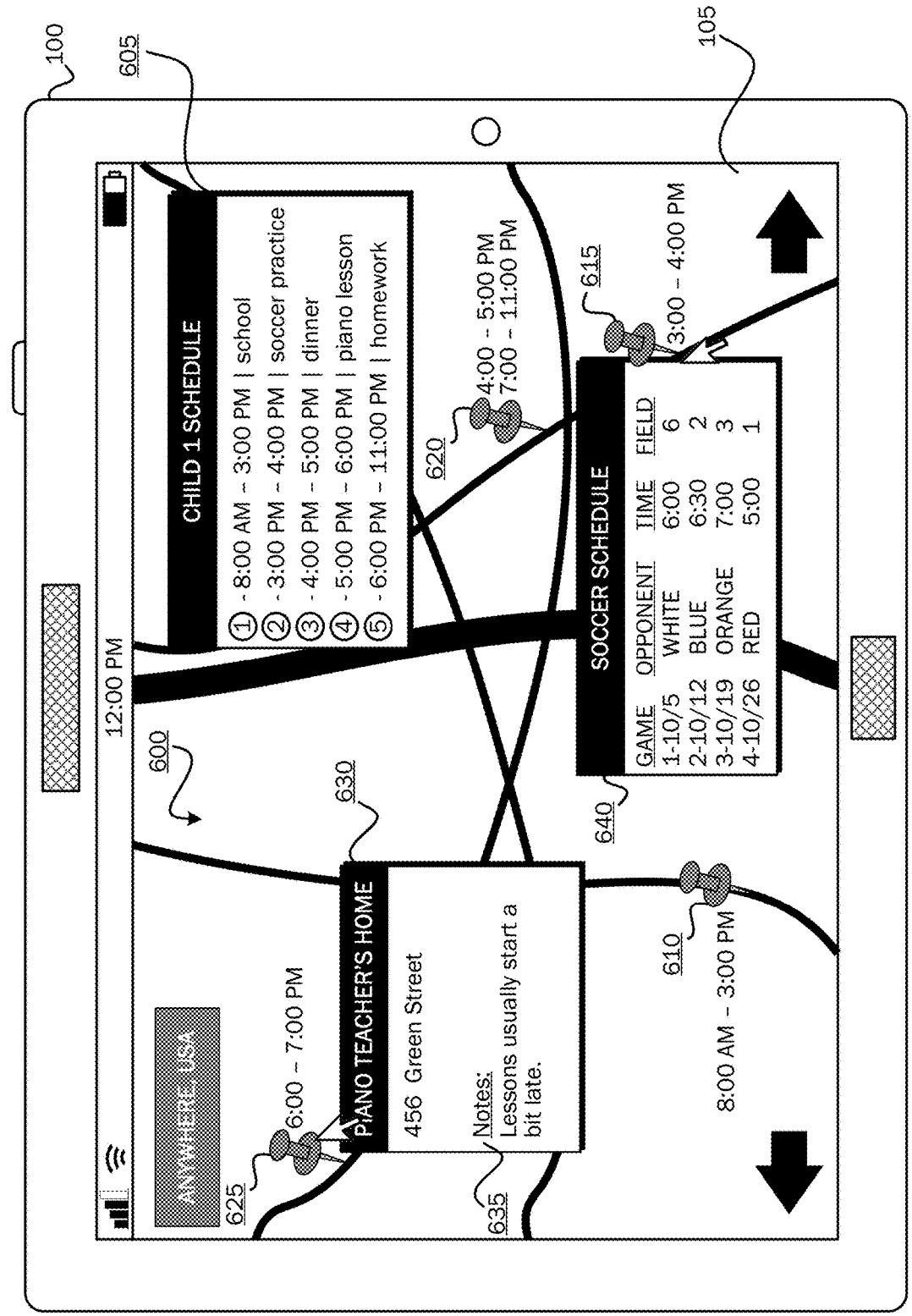
FIG. 6 is a simplified block diagram illustrating a visualization of one or more data items on a computer-generated map and showing a display of information associated with one or more identified data items.

Referring now to FIG. 6, another example visualization 106 is illustrated and described showing how various data items may be utilized for generating a helpful interactive visualization and showing how a user may filter the visualization based on various data items and how the user may "drill down" on individual data items to generate a secondary visualization 106. As illustrated in FIG. 6, a data file 605 is imported onto the visualization surface 105 to cause the data visualization application 125 to generate a mapping visualization 105 comprised of an electronic map 600 and including location icons/images 610, 615, 620, 625 associated with individual data items included in the imported data file 605.

For example, the data file 605 includes an example family schedule for a child. According to embodiments, the child's parents may drag the data file 605 containing the child's schedule onto the visualization surface 105 in order to generate a visualization containing an electronic map 600 and containing location-specific identification icons/images for each item on the child's schedule contained in the imported file 605. Referring to the example data items contained in the imported file 605, a first item shows the child at school from 8:00 a.m. to 3:00 p.m. A second item shows the child at soccer practice from 3:00 p.m. to 4:00 p.m. A third item shows the child at dinner from 4:00 p.m. to 5:00 p.m. A fourth item shows the child at piano lessons from 6:00 p.m. to 7:00 p.m., and a fifth item shows the child performing homework from 7:00 p.m. to 11:00 p.m.

As described above with reference to FIGS. 4 and 5, the data visualization application 125 parses the imported file 605 and uses the individual data items contained in the file 605 for obtaining information about individual data items including an address or other location information for locating each data item on the generated electronic map 605 and for obtaining other information about each data item that may be presented in a text box or a dialog box upon selection of an associated identifying icon/image 610, 615, 620, 625 located on the electronic map 600 for each imported data item. Following from the example illustrated in FIG. 6, an identifying icon/image 610 is positioned on the electronic map 600 at the location of the child's school. An identifying icon/image 615 is positioned on the electronic map 600 at the location of the child's soccer practice. An identifying icon/image 620 is positioned on the electronic map 600 at the location of the child's dinner. An identifying icon/image 625 is positioned on the electronic map 600 at the location of the child's piano lessons, and so on.

Thus, the data visualization application 125 generates an electronic map 600 along with the locations of each activity to be performed by the child according to the imported daily schedule for the child in the imported data file 605. If the user's parent desires more information about any particular location at which the child will engage in activities during the course of the day, the parent may select on one of the identifying icons/images for more information. For example, a selection of the icon/image 625 results in the display of a text box 630 containing information about the child's example piano lessons. For example, the text box 630 includes an identification that the location is at the child's piano teacher's home, an address for the piano teacher's home, and notes that may have previously been entered via a comments application for the child's piano lessons that were accessed by the data visualization application 125 for inclusion in the text box 630 for providing information upon selection of the associated identifying icon/image 625.

According to embodiments, data deposited and represented on the mapping visualization may be updated dynamically. For example, a data source may be dropped onto the mapping visualization that lists a child's schedule, as described above, but that also lists time stamps and a child's GPS location (e.g., for the child's mobile telephone). The mapping visualization may have an icon, such as a thumbtack pin, showing the current location of the child relative to all of the other points of interest associated with the child's schedule. As the child moves, the mapping visualization may be dynamically updated both as to the child's location and as to the child's schedules.

Referring still to FIG. 6, according to embodiments, a user may filter on or "drill down" on a given data item to cause the data visualization application 125 to generate and display a new visualization based on a different data file or a different one or more data items. For example, referring still to the example child schedule, if the user, for example, the child's parent, selects a data item from the data file 605, the user may cause the generation of a new or revised visualization from information associated with the selected item. For example, if the user selects on the second item in the data file 605 associated with the example soccer practice, a new data file 640 may be launched showing an example soccer schedule for an upcoming period, for example, for the next two weeks.

The newly launched data file may be dragged onto the mapping visualization for representation of the data from the file 640 on the mapping visualization. Referring to the data file 640, launched in response to a selection on the example soccer practice item from the data file 605, a list of additional data items is contained in the data file 640 associated with soccer game schedules for an upcoming period and including information such as dates of upcoming matches, opposing teams, field locations, and the like.

Figure 7:
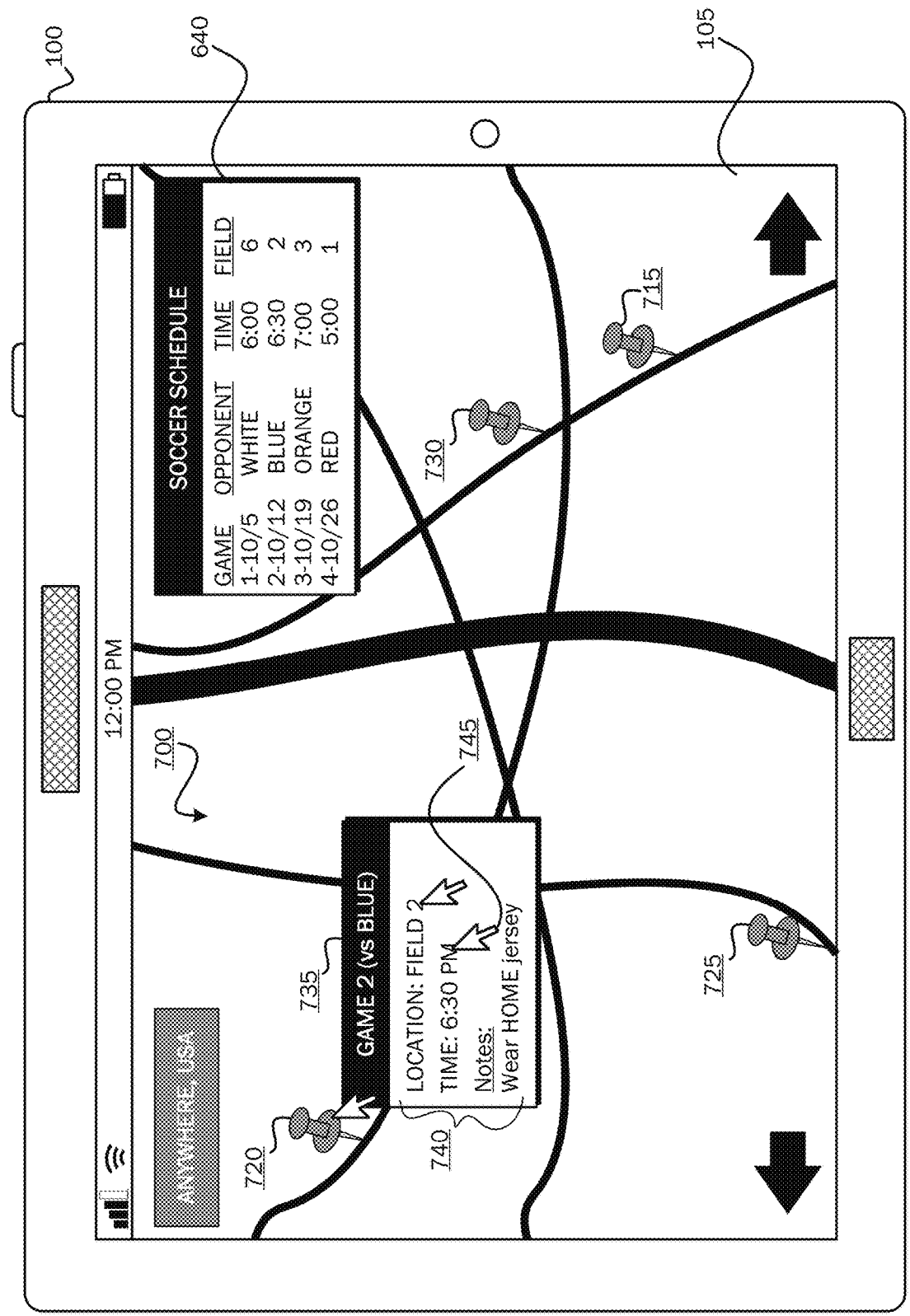
FIG. 7 is a simplified block diagram illustrating a visualization of one or more data items on a computer-generated map and showing a display of information associated with one or more identified data items.

Referring now to FIG. 7, the user may cause the data visualization application 125 to generate a new visualization comprised of an electronic map 700 and various data item identifications for the data file 640 exposed by selecting an item from the data file 605. As should be appreciated, the new visualization may be generated by dragging the data file 605 off of the visualization surface and leaving the data file 640 on the visualization surface to automatically cause the data visualization application 125 to generate a new visualization associated with the information contained in the data file 640. Alternatively, when the user launches the data file 640 by selecting an item from the data file 605, the user may select an action from a menu of actions for generating a visualization from the new data file 640. For example, the user may right click on the displayed data file 640 to be provided with a list of actions, one of which may include the generation of a visualization from the newly exposed data file 640. According to yet another alternative, the visualization illustrated in FIG. 6 may be revised automatically to include graphical representations associated with data items contained in the newly exposed data field 640 to supplement the graphical representations already illustrated in the map 605 of the visualization 600.

When the newly generated visualization generated, the visualization may include an electronic map 700 showing identification icons/images 715, 720, 725, 730 associated with the example soccer matches illustrated in the soccer schedule data file 640. As described above with respect to previous examples, the data visualization application 125 may obtain location information for each of the data items contained in the data file 640 as well as other information about each data item from one of the data repositories, 135, 140, 145, 150.

Furthermore, as described above, after the electronic map 700 is generated and after the icons/images identifying each data item are displayed at positions on the electronic map associated with locations for each data item, a user may select one of the identifying icons/images for launching a text box 735 for displaying information about the individual data item. For example, selection of the icon/image 720 may cause display of a text box 735 containing information about the soccer game 740 or match associated with the selected location including such information as field location, game time, and the like. As should be appreciated, data items within the exposed text box 735 may be selected for launching yet another data file and for causing the generation of yet another visualization comprised of another or different electronic map and showing various points of interest.

Figure 8:
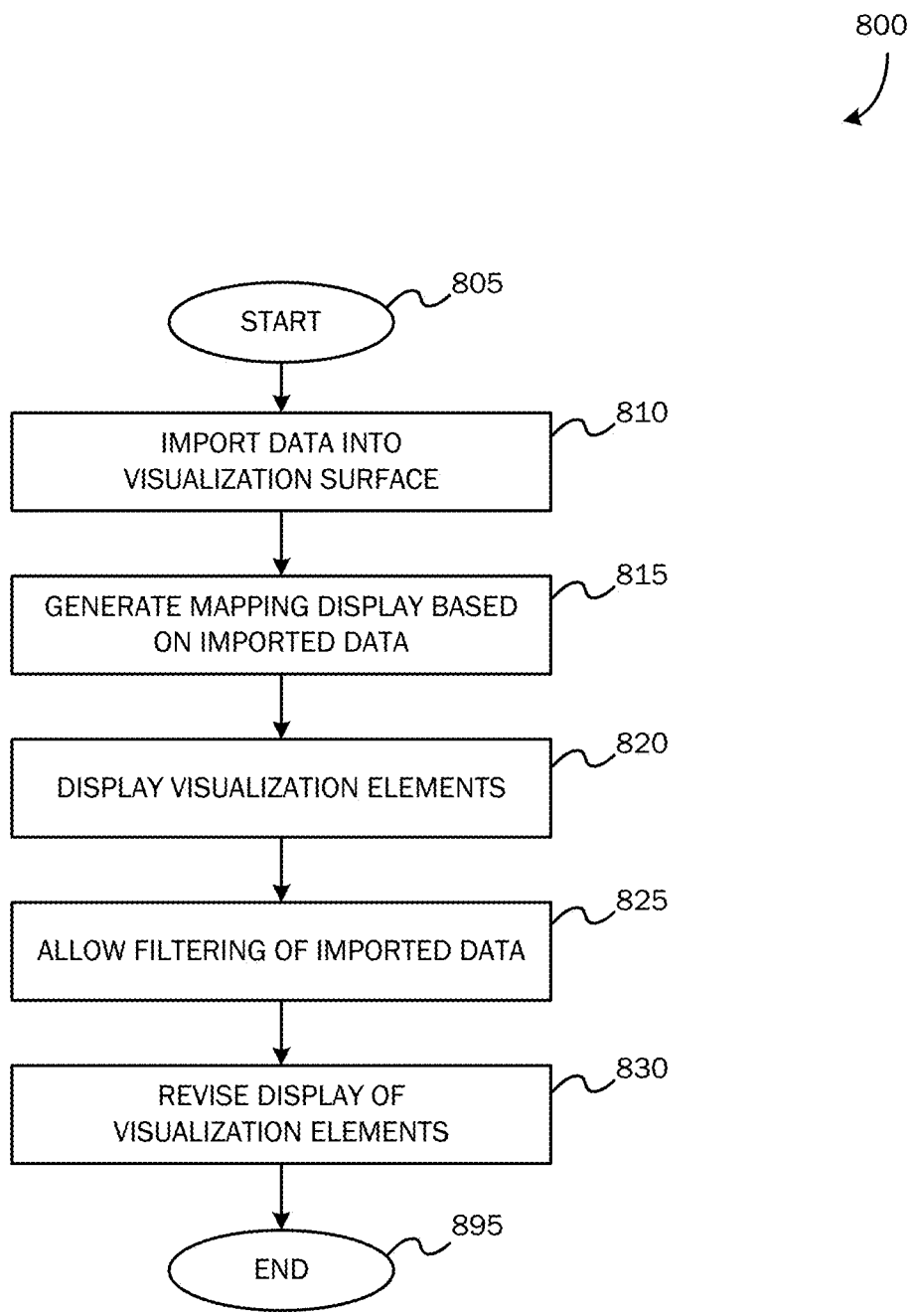
FIG. 8 is a flow chart illustrating a method of generating a visualization of one or more data items on a computer-generated map.

FIG. 8 is a flow chart illustrating a method of generating a visualization of one or more data items on a computer-generated map. The method 800 begins at start operation 805 and proceeds to operation 810 where data is imported onto the visualization surface 105, as described above. At operation 815, the data visualization application 125 generates a mapping display based on the imported data. As described above, the data visualization application 125 parses the imported data and passes individual data items to one or more data sources 135, 140, 145, 150 for obtaining information about each data item including location information for displaying an identifying icon/image for each data item on the generated electronic map, and the data visualization application 125 obtains other information about each data item for providing in a displayed text box or dialog box upon receiving a selection of an individual identifying icon/image.

At operation 820, the data visualization application 125 displays the visualization elements, including one or more charts 470, 205, 210, mapping elements (roads, structures, rivers, and data item icons/images, on the visualization surface 105 including an electronic map showing a geographical representation of sufficient geographical area to include location identification information for each imported data item.

At operation 825, filtering of imported data is enabled to allow a user to filter on individual data items or on categories of data items for dynamically changing the displayed visualization, as described above with reference to FIG. 7. In addition, at operation 825, any conditional formatting applied to any data element on the mapping visualization, as described above, may be applied as warranted by the data. At operation 830, the display of the visualization including the display of the geographic area of the electronic map and the display of various visualization elements is revised based on filtering performed by the user or based on the addition or deletion of various data items to the visualization surface 105. In addition, at operation 830, any live updates to the data applied to the mapping visualization, for example, live updates (changes) to data contained in a chart dropped on the mapping visualization are reflected in the visualization elements (including in the example chart and in any related visualization elements on the mapping visualization). The routine ends at operation 895.

Figure 9:
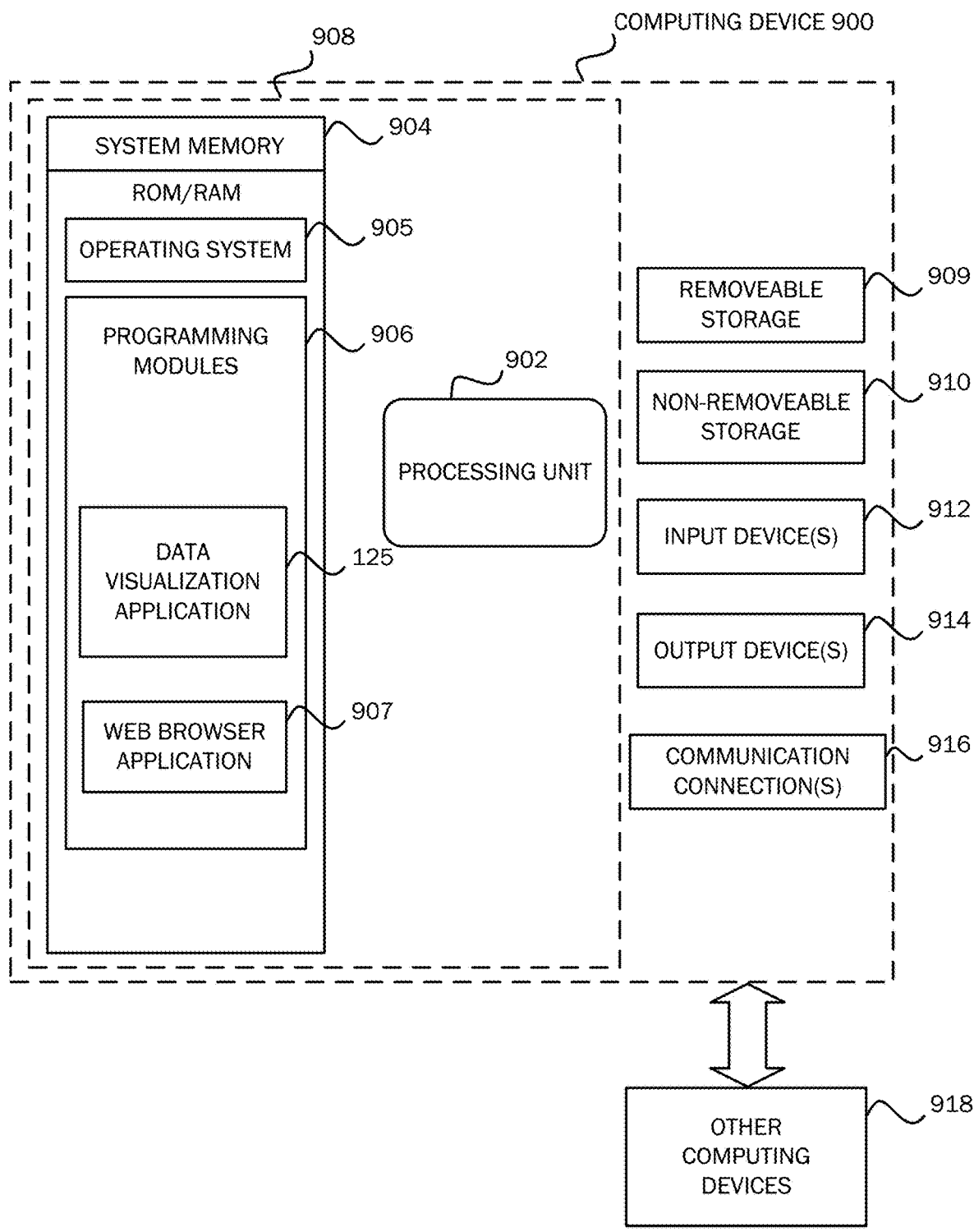
FIG. 9 is a simplified block diagram of a computing device with which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating example physical components of a computing device 900 with which embodiments of the invention may be practiced. The computing device components described below may be suitable for the computing devices described above, for example, the computing device 100. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include the data visualization application 125. Operating system 905, for example, may be suitable for controlling computing device 900's operation. Furthermore, embodiments of the invention may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910.

As stated above, a number of program modules and data files may be stored in system memory 904, including operating system 905. While executing on processing unit 902, programming modules 906, such as the data visualization application 125 may perform processes including, for example, one or more method 800's stages as described above. The aforementioned process is an example, and processing unit 902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the data visualization application 125 may be operated via application-specific logic integrated with other components of the computing device/system 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
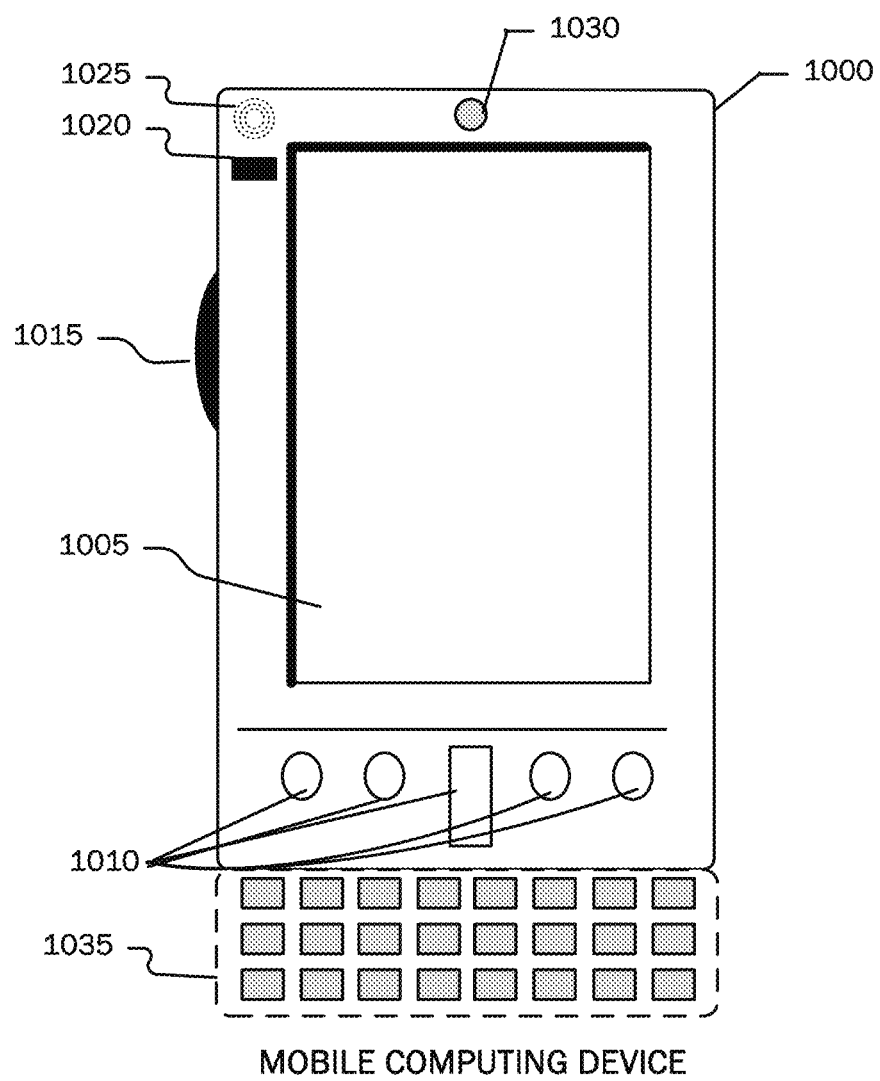
FIGS. 10A and 10B are simplified block diagrams of a mobile computing device with which embodiments of the present invention may be practiced.
Figure 10B:
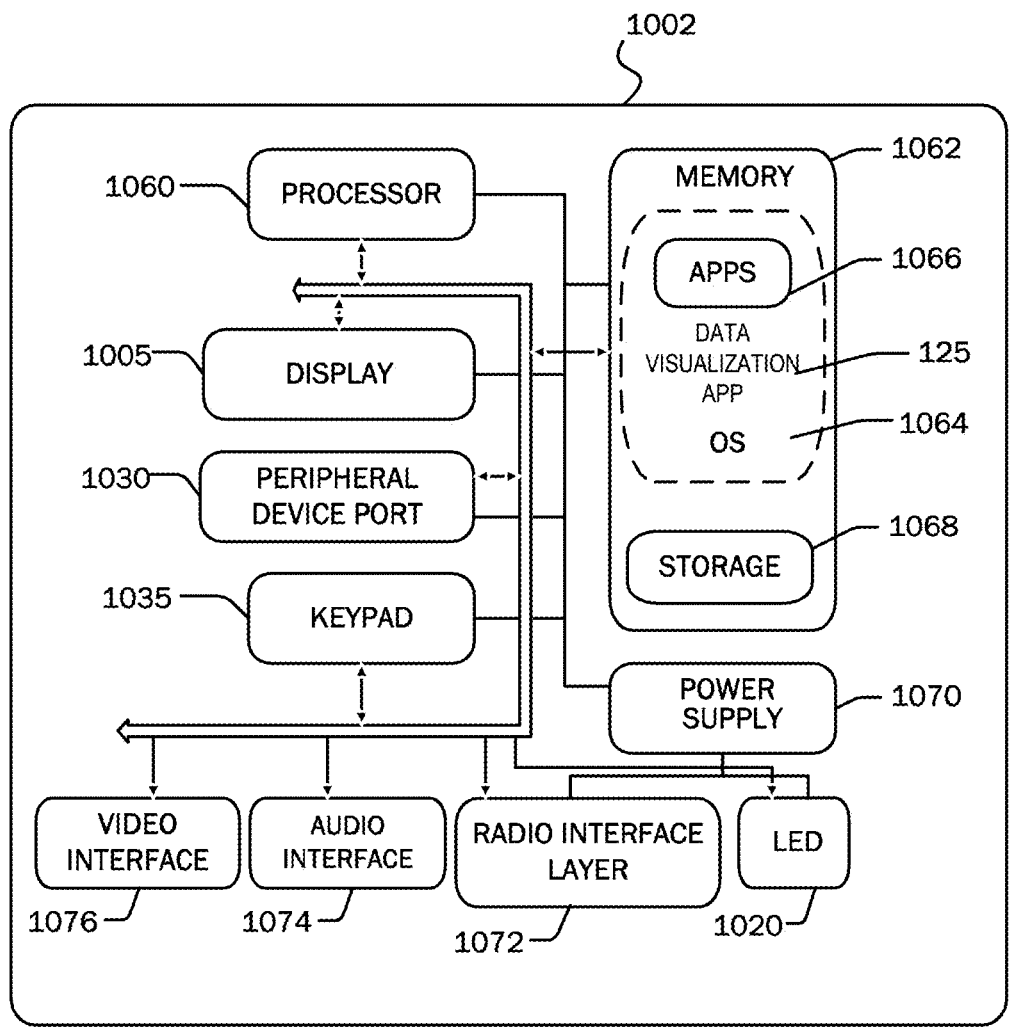
Figure 11:
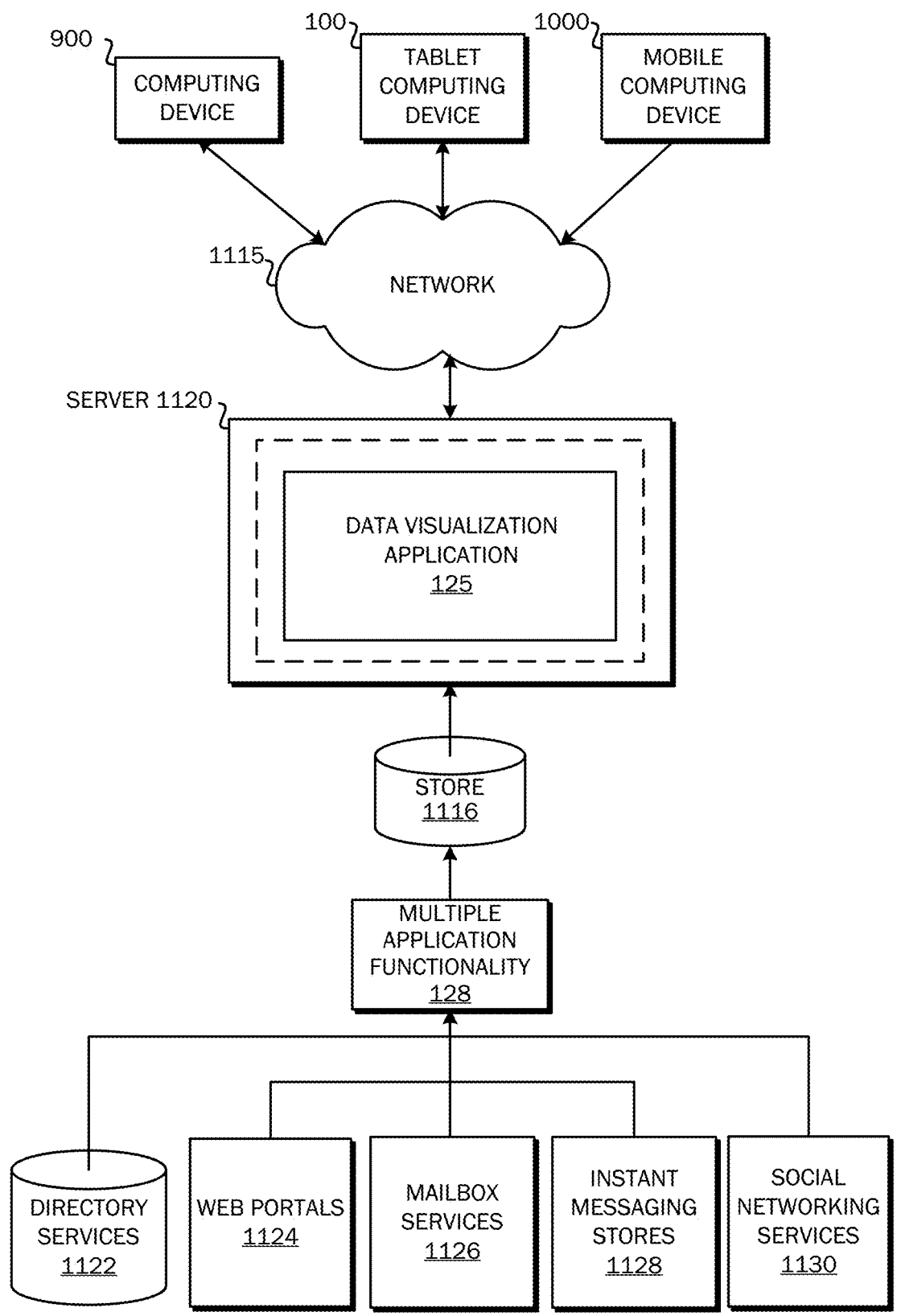
FIG. 11 is a simplified block diagram of a distributed computing system in which embodiments of the present invention may be practiced.

FIGS. 10A and 10B illustrate a suitable mobile computing environment, for example, a mobile telephone 1000, a smart phone, a tablet personal computer, a laptop computer, and the like, with which embodiments of the invention may be practiced. With reference to FIG. 10A, an example mobile computing device 1000 for implementing the embodiments is illustrated. In a basic configuration, mobile computing device 1000 is a handheld computer having both input elements and output elements. Input elements may include touch screen display 1005 and input buttons 1010 that allow the user to enter information into mobile computing device 1000. Mobile computing device 1000 may also incorporate an optional side input element 1015 allowing further user input. Optional side input element 1015 may be a rotary switch, a button, or any other type of manual input element. In alternative embodiments, mobile computing device 1000 may incorporate more or less input elements. For example, display 1005 may not be a touch screen in some embodiments. In yet another alternative embodiment, the mobile computing device is a portable phone system, such as a cellular phone having display 1005 and input buttons 1015. Mobile computing device 1000 may also include an optional keypad 1035. Optional keypad 1035 may be a physical keypad or a "soft" keypad generated on the touch screen display.

Mobile computing device 1000 incorporates output elements, such as display 1005, which can display a graphical user interface (GUI). Other output elements include speaker 1025 and LED light 1020. Additionally, mobile computing device 1000 may incorporate a vibration module (not shown), which causes mobile computing device 1000 to vibrate to notify the user of an event. In yet another embodiment, mobile computing device 1000 may incorporate a headphone jack (not shown) for providing another means of providing output signals.

Although described herein in combination with mobile computing device 1000, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1000 can incorporate system 1002 to implement some embodiments. For example, system 1002 can be used in implementing a "smart phone" that can run one or more applications similar to those of a desktop or notebook computer such as, for example, browser, e-mail, scheduling, instant messaging, and media player applications. In some embodiments, system 1002 is integrated as a computing device, such as an integrated personal digital assistant (PDA) and wireless phone.

One or more application programs 1066 may be loaded into memory 1062 and run on or in association with operating system 1064. Examples of application programs include phone dialer programs, e-mail programs, PIM (personal information management) programs, word processing programs, spreadsheet programs, Internet browser programs, messaging programs, and so forth. System 1002 also includes non-volatile storage 1068 within memory 1062. Non-volatile storage 1068 may be used to store persistent information that should not be lost if system 1002 is powered down. Applications 1066 may use and store information in non-volatile storage 1068, such as e-mail or other messages used by an e-mail application, and the like. A synchronization application (not shown) also resides on system 1002 and is programmed to interact with a corresponding synchronization application resident on a host computer to keep the information stored in non-volatile storage 1068 synchronized with corresponding information stored at the host computer. As should be appreciated, other applications may be loaded into memory 1062 and run on the device 1000, including the data visualization application 125, described herein.

System 1002 has a power supply 1070, which may be implemented as one or more batteries. Power supply 1070 might further include an external power source, such as an AC adapter or a powered docking cradle that supplements or recharges the batteries.

System 1002 may also include a radio 1072 that performs the function of transmitting and receiving radio frequency communications. Radio 1072 facilitates wireless connectivity between system 1002 and the "outside world", via a communications carrier or service provider. Transmissions to and from radio 1072 are conducted under control of OS 1064. In other words, communications received by radio 1072 may be disseminated to application programs 1066 via OS 1064, and vice versa.

Radio 1072 allows system 1002 to communicate with other computing devices, such as over a network. Radio 1072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1002 is shown with two types of notification output devices; LED 1020 that can be used to provide visual notifications and an audio interface 1074 that can be used with speaker 1025 to provide audio notifications. These devices may be directly coupled to power supply 1070 so that when activated, they remain on for a duration dictated by the notification mechanism even though processor 1060 and other components might shut down for conserving battery power. LED 1020 may be programmed to remain on indefinitely until the user takes action to indicate the powered-on status of the device. Audio interface 1074 is used to provide audible signals to and receive audible signals from the user. For example, in addition to being coupled to speaker 1025, audio interface 1074 may also be coupled to a microphone to receive audible input, such as to facilitate a telephone conversation. In accordance with embodiments of the present invention, the microphone 920 may also serve as an audio sensor to facilitate control of notifications, as will be described below. System 1002 may further include video interface 1076 that enables an operation of on-board camera 1030 to record still images, video stream, and the like.

A mobile computing device implementing system 1002 may have additional features or functionality. For example, the device may also include additional data storage devices (removable and/or non-removable) such as, magnetic disks, optical disks, or tape. Such additional storage is illustrated in FIG. 10B by storage 1068. Computer storage media may include volatile and nonvolatile, removable and non-removable media implemented in any method or technology for storage of information, such as computer readable instructions, data structures, program modules, or other data.

Data/information generated or captured by the device 1000 and stored via the system 1002 may be stored locally on the device 1000, as described above, or the data may be stored on any number of storage media that may be accessed by the device via the radio 1072 or via a wired connection between the device 1000 and a separate computing device associated with the device 1000, for example, a server computer in a distributed computing network, such as the Internet. As should be appreciated such data/information may be accessed via the device 1000 via the radio 1072 or via a distributed computing network. Similarly, such data/information may be readily transferred between computing devices for storage and use according to well-known data/information transfer and storage means, including electronic mail and collaborative data/information sharing systems.

FIG. 11 illustrates a system architecture for providing content visualizations to one or more client devices, as described above. Content developed, interacted with or edited in association with a data visualization application 125 may be stored in different communication channels or other storage types. For example, various content items along with information from which they are developed may be stored using directory services 1122, web portals 1124, mailbox services 1126, instant messaging stores 1128 and social networking sites 1130. The data visualization application 125 may use any of these types of systems or the like for enabling content utilization, as described herein. A server 1120 may provide content visualizations to clients. As one example, server 1120 may be a web server providing content visualizations over the web. Server 1120 may provide online content visualizations over the web to clients through a network 1115. Examples of clients that may obtain content visualizations include computing device 900, which may include any general purpose personal computer, a tablet computing device 100 and/or mobile computing device 1000 which may include smart phones. Any of these devices may obtain content from the store 1116.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for data visualization, comprising:
   importing data items from an electronic data source;
   determining a location associated with each of the data items imported from the electronic data source;
   causing display of an electronic map of a geographical area, wherein the electronic map is dynamically generated based on the determined locations associated with the imported data items;
   determining positions on the electronic map corresponding to the determined locations associated with the imported data items;
   causing display of a visualization element that is graphically representative of a combination of the imported data items on the electronic map, wherein the visualization element is displayed at or near the determined positions corresponding to the determined locations of the imported data items associated with the combination of imported data items, and wherein the visualization element includes a user-interactive drill-down feature to obtain additional information about a specific one or more of the combination of imported data items;
   receiving, from the electronic data source, a change to at least one imported data item of the imported data items; and
   dynamically modifying the visualization element by modifying the graphical representation of the combination of imported data items in accordance with the received change.

2. The method of claim 1, wherein a second change is received via user-interaction with the visualization element that is graphically representative of the combination of imported data items.

3. The method of claim 1, wherein the imported data items are actively linked to the electronic data source and wherein the change comprises a change to at the electronic data source.

4. The method of claim 1, wherein the imported data items are associated with an electronic file and wherein the electronic file is selected from a menu of electronic files.

5. The method of claim 1, wherein the electronic map is generated with a map visualization application and wherein the method further comprises:
utilizing the functionality of a non-map visualization application to generate the visualization element that is graphically representative of the combination of imported data items.

6. The method of claim 5, wherein the visualization element that is graphically representative of the combination of imported data items comprises an object that comprises at least one of a spreadsheet object, a slide presentation object, a note object, a graph object, a chart object, and a calendar object.

7. The method of claim 1, wherein the visualization element that is graphically representative of the combination of imported data items comprises a listing of the data items imported from the electronic data source.

8. The method of claim 1, wherein the visualization element that is graphically representative of the combination of imported data items comprises one of a graph or a chart representation of the combination of imported data items.

9. The method of claim 1, wherein the graphical representation comprises a bar chart or a pie chart.

10. The method of claim 1, wherein the visualization element that is graphically representative of the combination of imported data items includes a user-interactive filtering feature that filters the combination of imported data items.

11. The method of claim 1, the method further comprising:
using the user-interactive drill-down feature to obtain additional information about the specific one or more of the combination of imported data items; and
responsive to use of the drill-down feature, generating and causing display of a new visualization element graphically representative of the specific one or more of the combination of imported data items.

12. The method of claim 1, wherein more than one visualization element is representative of a combination of imported data items, including a first visualization element of a first display type that is graphically representative of a first combination of imported data items and a second visualization element of a second display type that is representative of a second combination of imported data items, wherein the first display type is different than the second display type.

13. The method of claim 12, wherein the first combination of imported data items are interdependent with the second combination of imported data items and wherein a change in either the first or second combination of imported data items causes dynamic modification of each of the first and second visualization elements.

14. The method of claim 12, further comprising:
associating a first identifier with the first visualization element and a second identifier, different from the first identifier, with the second visualization element; and
causing display of a legend on the electronic map, wherein the legend includes the first and second identifiers.

15. A system for data visualization comprising:
a memory device that stores executable instructions;
a processor that executes the stored executable instructions; and
a display device that displays images as directed by the processor, wherein execution of the stored executable instructions by the processor causes the processor to:
import data items from at least one electronic data source;
determine a location associated with each of the data items imported from the at least one electronic data source;
cause display of an electronic map of a geographical area, wherein the electronic map is dynamically generated based on the determined locations associated with the imported data items;
determine positions on the electronic map corresponding to the determined locations associated with the imported data items;
cause display of a visualization element representative of a combination of the imported data items on the electronic map, wherein the visualization element is one of a chart or a graph representative of the combination of imported data items, and wherein the visualization element includes a user-interactive drill-down feature to obtain additional information about a specific one or more of the combination of imported data items;
receive, from the at least one electronic data source, a change to at least one imported data item of the imported data items; and
dynamically modify the visualization element by modifying the chart or the graph representative of the combination of imported data items in accordance with the received change.

16. The system of claim 15, wherein a second change is received via user-interaction with the visualization element representative of the combination of imported data items.

17. The system of claim 15, wherein the imported data items are actively linked to the at least one electronic data source and wherein the change comprises a change to at the at least one electronic data source.

18. The system of claim 15, wherein the electronic map is generated with a map visualization application and wherein the processor is further caused to:
utilize the functionality of a non-map visualization application to generate the visualization element that is representative of the combination of imported data items.

19. Computer storage media storing computer-executable instructions which, when executed by a computing device, cause the computing device to:
import data items from at least one electronic data source;
determine a location associated with each of the data items imported from the at least one electronic data source;
cause display of an electronic map of a geographical area, wherein the electronic map is dynamically generated based on the determined locations associated with the imported data items;
determine positions on the electronic map corresponding to the determined locations associated with the imported data items;
cause display of a visualization element that is graphically representative of a combination of the imported data items on the electronic map, wherein the visualization element is displayed at or near the determined positions corresponding to the determined locations of imported data items associated with the combination of imported data items, and wherein the visualization element includes a user-interactive drill-down feature to obtain additional information about a specific one or more of the combination of imported data items;
receive, from the at least one electronic data source, a change to at least one imported data item of the imported data items; and dynamically modify the visualization element by modifying the graphical representation of the combination of imported data items in accordance with the received change.

* * * * *